(12) United States Patent
Hollinger

(10) Patent No.: US 11,371,609 B2
(45) Date of Patent: Jun. 28, 2022

(54) SYSTEMS, DEVICES, AND/OR METHODS FOR IMPROVING ENGINE EFFICIENCY

(71) Applicant: Ted Hollinger, Greeneville, TN (US)

(72) Inventor: Ted Hollinger, Greeneville, TN (US)

( * ) Notice: Subject to any disclaimer, the term of this patent is extended or adjusted under 35 U.S.C. 154(b) by 0 days.

(21) Appl. No.: 17/285,423

(22) PCT Filed: Sep. 30, 2019

(86) PCT No.: PCT/US2019/053753
§ 371 (c)(1),
(2) Date: Apr. 14, 2021

(87) PCT Pub. No.: WO2020/086216
PCT Pub. Date: Apr. 30, 2020

(65) Prior Publication Data
US 2021/0341056 A1    Nov. 4, 2021

Related U.S. Application Data

(60) Provisional application No. 62/751,463, filed on Oct. 26, 2018.

(51) Int. Cl.
| | |
|---|---|
| *F16J 1/00* | (2006.01) |
| *F02F 3/00* | (2006.01) |
| *F02F 3/10* | (2006.01) |
| *F04B 1/12* | (2020.01) |
| *F04B 1/124* | (2020.01) |
| *F04B 39/00* | (2006.01) |
| *F16J 1/22* | (2006.01) |

(52) U.S. Cl.
CPC .............. *F16J 1/005* (2013.01); *F02F 3/0015* (2013.01); *F04B 1/124* (2013.01); *F04B 39/0005* (2013.01); *F16J 1/22* (2013.01)

(58) Field of Classification Search
CPC . F02B 75/32; F02B 75/30; F02B 75/38; F16J 1/12; F16J 9/06; F16J 1/08; F02F 3/0015; F02F 3/00; F02F 7/0021
See application file for complete search history.

(56) References Cited

U.S. PATENT DOCUMENTS

| | | | | |
|---|---|---|---|---|
| 3,537,437 A | * | 11/1970 | Paul ...................... | F02B 75/16 123/197.1 |
| 4,829,954 A | * | 5/1989 | Morgado ............... | F01B 9/026 29/888.047 |
| 5,724,863 A | * | 3/1998 | Kramer .................. | F02B 41/04 74/579 E |
| 2007/0143998 A1 | * | 6/2007 | Stauder ................. | F02F 7/0046 29/888.011 |
| 2009/0145377 A1 | * | 6/2009 | Gaiser ................... | F01B 3/0005 123/196 R |

(Continued)

*Primary Examiner* — Long T Tran
(74) *Attorney, Agent, or Firm* — Dale Jensen, PLC; Dale Jensen

(57) ABSTRACT

Certain exemplary embodiments can provide a piston comprising a piston head, a connecting rod coupled to the piston head, a stabilizer bar, a retaining ring, and a stabilizer bar collar. The stabilizer bar collar defines one or more apertures. The one or more apertures are constructed to receive the stabilizer bar. The piston is constructed to reduce energy losses in an engine comprising the piston.

37 Claims, 39 Drawing Sheets
(36 of 39 Drawing Sheet(s) Filed in Color)

(56) References Cited

U.S. PATENT DOCUMENTS

| | | | |
|---|---|---|---|
| 2013/0269634 A1* | 10/2013 | Rez | F01B 9/047 |
| | | | 123/197.5 |
| 2014/0318363 A1* | 10/2014 | Bennett | F04B 53/146 |
| | | | 417/559 |
| 2015/0330296 A1* | 11/2015 | Velazquez | F02B 75/021 |
| | | | 123/197.3 |
| 2017/0211469 A1* | 7/2017 | Riazati | F01L 1/026 |

* cited by examiner

2000

4000

5000

6000

7000

8000

9000

10000

11000

12000

13000

14000

15000

16000

17000

18000

19000

19200

22000

22500

25000

26000

28000

30000

31000

32000

37000

SYSTEMS, DEVICES, AND/OR METHODS FOR IMPROVING ENGINE EFFICIENCY

CROSS-REFERENCES TO RELATED APPLICATIONS

This application is a national stage election of International Application No. PCT/US19/53753, filed Sep. 30, 2019. This application claims priority to, and incorporates by reference herein in its entirety, U.S. Provisional Patent Application Ser. No. 62/751,463, filed Oct. 26, 2018.

BRIEF DESCRIPTION OF THE DRAWINGS

The patent or application file contains at least one drawing executed in color. Copies of this patent or patent application publication with color drawing(s) will be provided by the Office upon request and payment of the necessary fee. FIGS. 1-2, FIGS. 3A-3D, FIGS. 4-17, FIGS. 18A-18C, and FIGS. 19-38 are executed in color. A wide variety of potential practical and useful embodiments will be more readily understood through the following detailed description of certain exemplary embodiments, with reference to the accompanying exemplary drawings in which:

FIG. 1 is a photograph of a perspective view of an exemplary embodiment of a piston assembly 1000;

FIG. 2 is a photograph of a perspective view of an exemplary embodiment of a piston assembly 2000;

FIG. 3A, FIG. 3B, and FIG. 3C are side views of an exemplary embodiment of a system 3000;

FIG. 4 is a sectional view of an exemplary embodiment of a piston head 4000;

FIG. 5 is a sectional view of an exemplary embodiment of a piston head 5000;

FIG. 6 is a sectional view of an exemplary embodiment of a piston head 6000;

FIG. 7 is a sectional view of an exemplary embodiment of a piston head 7000;

FIG. 8 is a sectional view of an exemplary embodiment of a piston head 8000;

FIG. 9 is a sectional view of an exemplary embodiment of a piston head 9000;

FIG. 10 is a sectional view of an exemplary embodiment of a piston head 10000;

FIG. 11 is a sectional view of an exemplary embodiment of a piston head 11000;

FIG. 12 is a sectional view of an exemplary embodiment of a piston head 12000;

FIG. 13 is a photograph of a perspective view of exemplary embodiments of engine cylinder sleeves 13000;

FIG. 14 is a photograph of a perspective view of an exemplary embodiment of a portion of a engine cylinder sleeve 14000;

FIG. 15 is a photograph of a perspective view of an exemplary embodiment of a system 15000;

FIG. 16 is a photograph of a perspective view of an exemplary embodiment of a connecting rod 16000;

FIG. 17 is a photograph of a perspective view of an exemplary embodiment of a connecting rod 17000;

FIG. 18A, FIG. 18B, and FIG. 18C are side views of an exemplary embodiment of a system 18000;

FIG. 19 is a photograph of a perspective view of an exemplary embodiment of a piston assembly 19000;

FIG. 20 is a photograph of a perspective view of an exemplary embodiment of a system 20000;

FIG. 21 is a photograph of a perspective view of an exemplary embodiment of a system 21000;

FIG. 23 is a graph 23000;

FIG. 24 is a graph 24000;

FIG. 25 is a photograph of a perspective view of an exemplary embodiment of a piston head 25000;

FIG. 26 is a photograph of a perspective view of an exemplary embodiment of a piston head 26000;

FIG. 27 is a photograph of a perspective view of an exemplary embodiment of a stabilized piston assembly 27000;

FIG. 28 is a photograph of a perspective view of an exemplary embodiment of a one ring piston head 28000;

FIG. 29 is a photograph of a perspective view of an exemplary set of pistons and piston assemblies 29000;

FIG. 30 is a photograph of a perspective view of an exemplary embodiment of a diesel piston 30000;

FIG. 31 is a photograph of a perspective view of an exemplary embodiment of a diesel piston 31000;

FIG. 32 is a photograph of a perspective view of an exemplary embodiment of a diesel piston 32000;

FIG. 33 is a graph 33000;

FIG. 34 is a graph 34000;

FIG. 35 is a graph 35000;

FIG. 36 is a graph 36000;

FIG. 37 is a diagram of an exemplary bearing ball 37000; and

FIG. 38 is a diagram of a top view of a diesel piston 38000.

DETAILED DESCRIPTION

Figure 1:
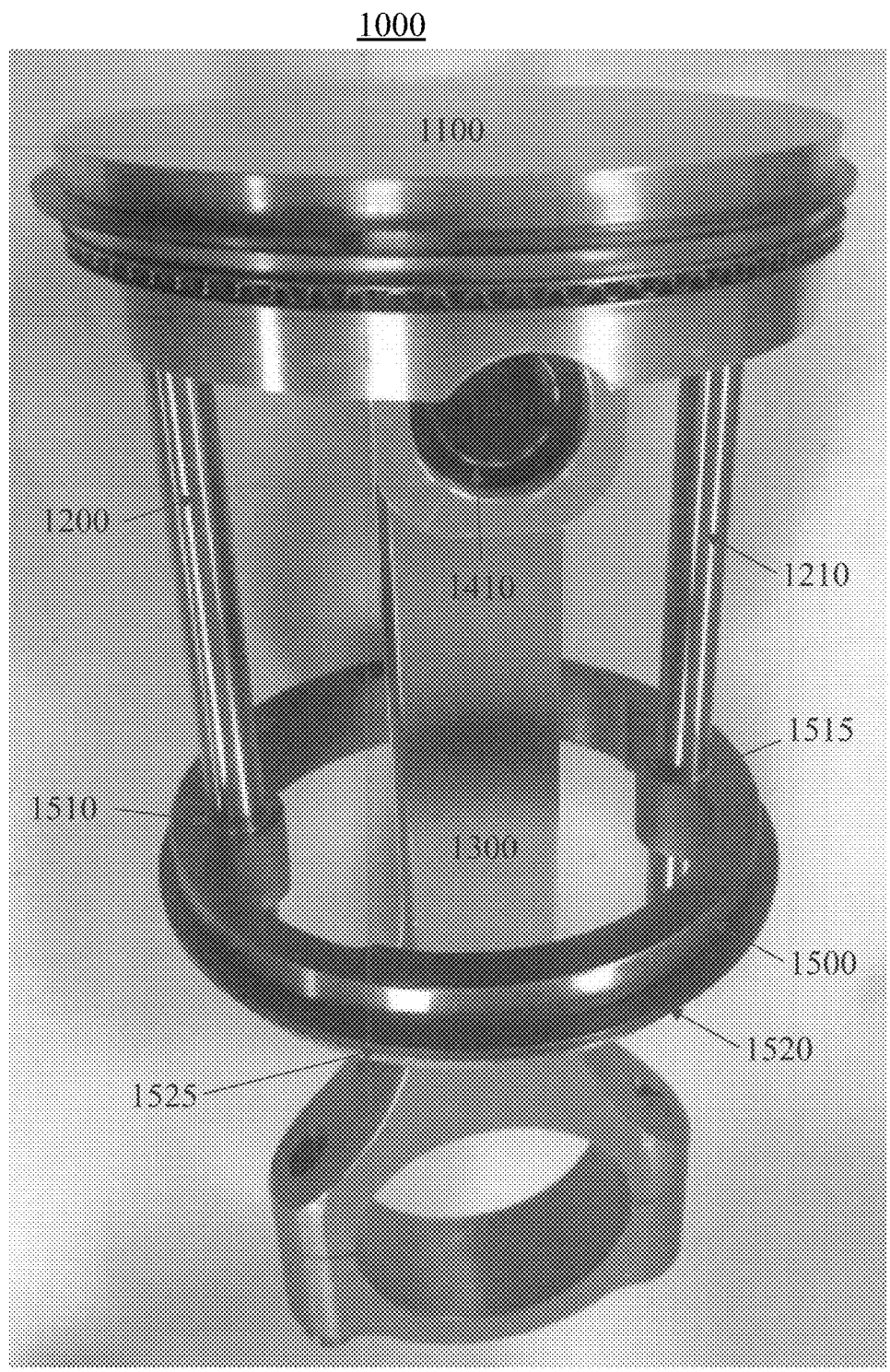

Certain exemplary embodiments can provide a piston comprising a piston head, a connecting rod coupled to the piston head, a stabilizer bar, a retaining ring, and a stabilizer bar collar. The stabilizer bar collar defines one or more apertures. The one or more apertures are constructed to receive the stabilizer bar. The piston is constructed to reduce energy losses in an engine comprising the piston.

Internal combustion engines have historically had relatively low efficiencies. A rule of thumb is that approximately 30% of fuel energy goes to a driveshaft, approximately 30% to exhaust, approximately 30% to cooling and approximately 10% is radiated. This rough approximation (30%/30%/30%/10%) will be used for discussion purposes.

Certain exemplary embodiments improve energy efficiencies. The biggest loss is friction between piston rings and piston skirts, followed by the energy required to operate valve systems, closely followed by pumping losses, and then the water pump, oil pump, crankshaft, etc. Approximately half of all the friction is in the pistons and rings. Reducing friction losses between the pistons and rings by half results in an improved 45%/30%/15%/10% engine.

Certain exemplary embodiments comprise a new piston with dual connecting rods and a stabilizer bar to reduce friction and extend engine life.

Certain exemplary embodiments provide a piston with one or more piston rings where the top ring is a compression ring, and has one or more stabilizer bars attached to the piston orthogonal to the plane of the top piston ring where each stabilizer bar passes thru a bushing (guide) mounted inside the cylinder or immediately below the cylinder at a distance equal to the height of the piston from its skirt to the piston top plus the stroke length plus the required distance needed to keep the piston form hitting the bushing or its retainer.

This arrangement, known as the stabilized piston, prevents the piston from "tilting" inside the cylinder and removes the need for the piston skirt entirely. It also allows the piston designer to remove one compression ring by using a gapless ring and removing the oil ring because the piston skirt no longer prevents oil from reaching the compression ring. When the stabilized piston is designed without a skirt and with only one gapless compression ring the friction of the piston and skirt are reduced more than 50%.

A typical engine has two energy loss components;

The first is the loss inside the cylinder. This is generally referred to the Carnot cycle efficiency. Most modern engines will have in-cylinder Carnot cycle efficiencies of approximately 50 to 58%. The Carnot cycle is not generally affected by this design technique.

The second loss component is friction in the engine. Approximately one half of the friction losses are in the piston rings. Prior to about 1950 almost all engines had four piston rings. The pistons were longer and had a full skirt at the bottom. They had two piston rings at the top followed by an oil ring and then a fourth ring near the bottom. This design was replaced by a three-ring design where the bottom ring was eliminated and the piston skirt was shortened and trimmed to reduce friction. This new piston design is used in engines today. Current exemplary engines are approximately 30% efficient when measured at the flywheel. A loss in efficiency between approximately 20 to 28% from the cylinder to the flywheel is the focus of current exemplary embodiments. Approximately 50% of such losses are believed to be in piston rings. As such, reducing the count of rings would reduce the losses and improve overall engine efficiency. Current exemplary embodiments use only one gapless ring at the top of the piston and add a stabilizer bar to the piston so that the piston does not twist to either side. This reduces both friction and wear. To accomplish this a groove is machined into connecting rods for stabilizer bars to pass. This is accomplished by using connecting rods constructed to allow room for passage of the stabilizer bars. Crankshafts and engine blocks are modified for exemplary designs.

The reduction in piston ring friction is expected to be approximately 50%. It is currently expected that approximately 10 to 14% of energy losses are lost in the piston rings. The improvement in efficiency can be approximately 5 to 7% overall. This improvement comes from a low temperature cooling side of the engine. The exhaust temperature does not substantially change. Certain exemplary embodiments provide a reduction is fuel consumption of approximately 20%. This fuel savings can pay for extra costs of engine modifications. A further benefit is that the cylinder wear can be reduced and cylinders last longer as compared to other exemplary designs.

Certain exemplary embodiments reduce the friction between piston rings and piston skirts with cylinder walls of internal combustion engines. Certain exemplary embodiments add stabilizer bars restrain pistons from twisting in cylinders. In certain exemplary embodiments, piston skirts never touch the cylinder walls and the piston rings travel relatively smoothly over honing in the cylinder walls.

The friction of piston rings and piston skirts with cylinder walls is reduced via the utilization of two stabilizer bars. The stabilizer bars can have special coatings to reduce friction.

The efficiency will increase by about 25%. This will an engine to use 25% less fuel and produce 25% less emissions. The new technology reduces friction and thereby reduces wear on the cylinder walls. Certain exemplary embodiments run cooler and last longer (such as approximately twice as long). Certain exemplary embodiments can provide lower emissions and better fuel economy.

Certain exemplary embodiments provide improvements to fuel economy and emissions. For example, California has serious environmental issues with approximately 14.5 million licensed vehicles and 5.2 million trucks. Vehicles in California used approximately 4.2 million gallons of diesel fuel in 2015 according to the California Board of Equalization representing approximately 17% of total fuel sales behind gasoline. According to certain public information, citizens and businesses in California produce approximately 20% of all global warming greenhouse gases. Similar issues exist in other locations in the world, such as Mexico City.

FIG. 1 is a photograph of a perspective view of an exemplary embodiment of a piston assembly 1000, which comprises a piston head 1100, a first stabilizer bar 1200, and a second stabilizer bar 1210.

Figures 3A, 3B, 3C:
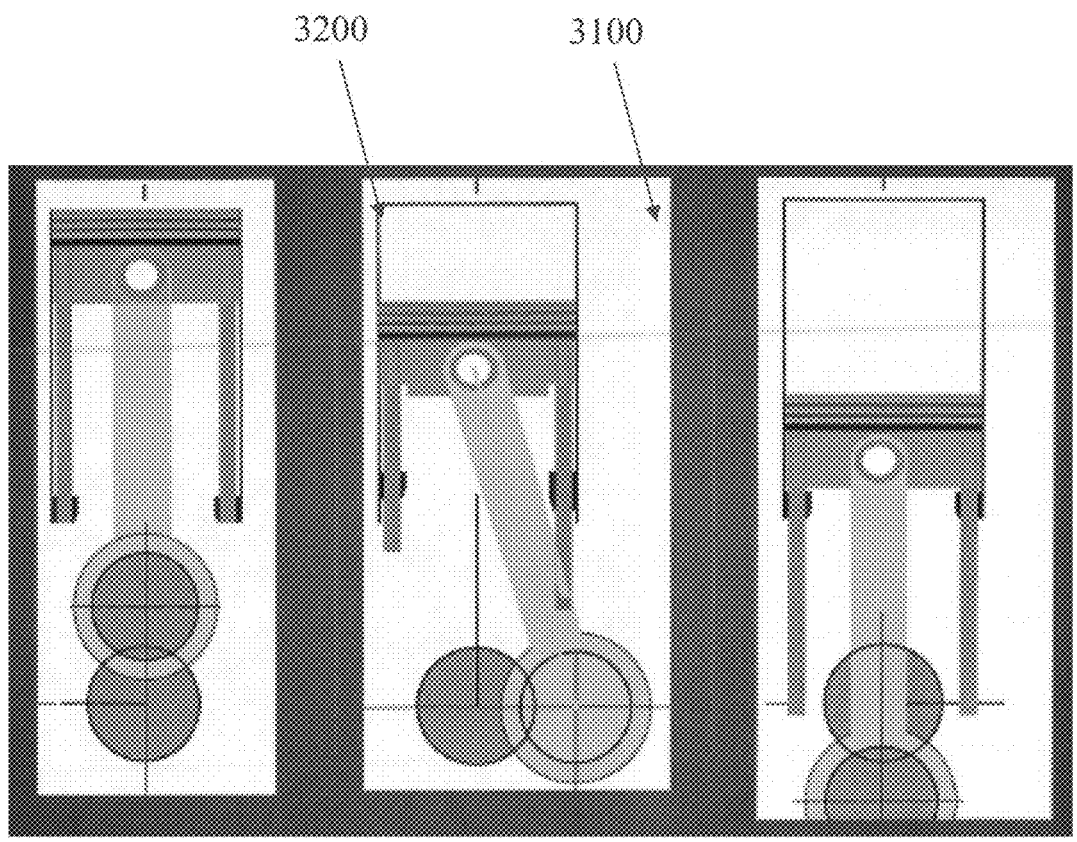

Certain exemplary embodiments comprise:

an engine block (e.g., engine block 3100 of FIG. 3B);

piston assembly 1000, which comprises piston head 1100 and a connecting rod 1300 coupled to piston head 1100;

first stabilizer bar 1200, which is coupled to piston head 1100, first stabilizer bar 1200 is constructed to align piston assembly 1000 as it cycles in the engine block thereby reducing friction;

second stabilizer bar 1210, which is coupled to piston head 1100, second stabilizer bar 1210 is also constructed to align the piston as it cycles in the engine block thereby reducing friction;

a third stabilizer bar (see, e.g., stabilizer bar 38140 of FIG. 38) that is constructed to align piston assembly 1000 as it cycles in the engine block thereby reducing friction;

a fourth stabilizer bar (see, e.g., stabilizer bar 38160 of FIG. 38) that is constructed to align piston assembly 1000 as it cycles in the engine block thereby reducing friction;

a wrist pin 1400, which couples connecting rod 1300 to piston head 1100, wrist pin 1400 can be retained by a C ring 1410, in other embodiments, wrist pin 1400 can be wrist pin pressed through connecting rod 1300; and a stabilizer bar collar 1500 that is notched on its inside to allow a big end of connecting rod 1300 to pass through, wherein stabilizer bar collar 1500 is constructed to align first stabilizer bar 1200 relative to piston head 1100.

Figure 37:
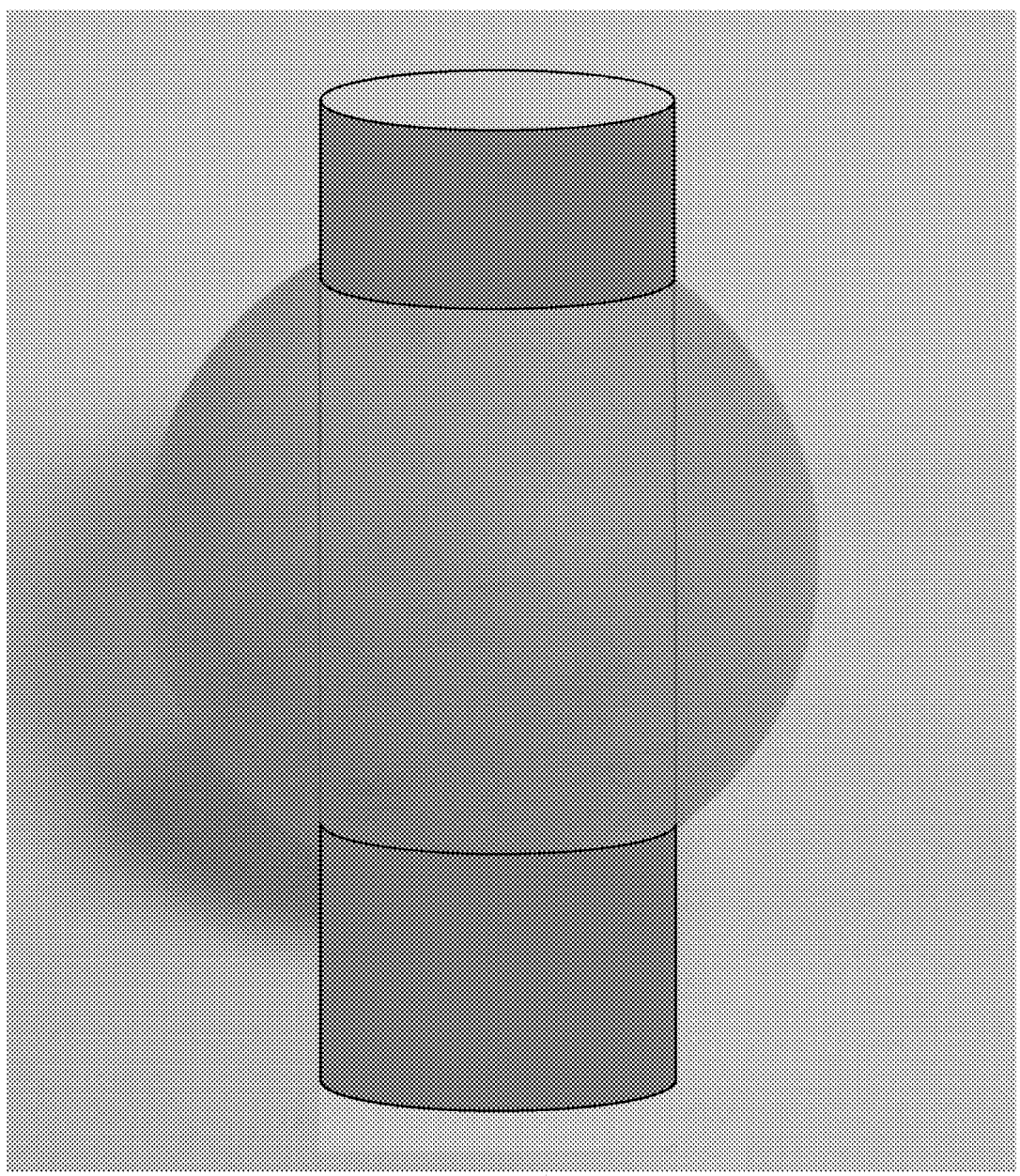

Stabilizer bar collar 1500 can comprise a first bushed aperture 1510, wherein:

stabilizer bar collar 1500 is constructed to align first stabilizer bar 1200 relative to piston head 1100; and first bushed aperture 1510 comprises a ball bearing type collar bushing (see, e.g., a bushing utilizing bearing ball 37000 of FIG. 37).

Figure 38:
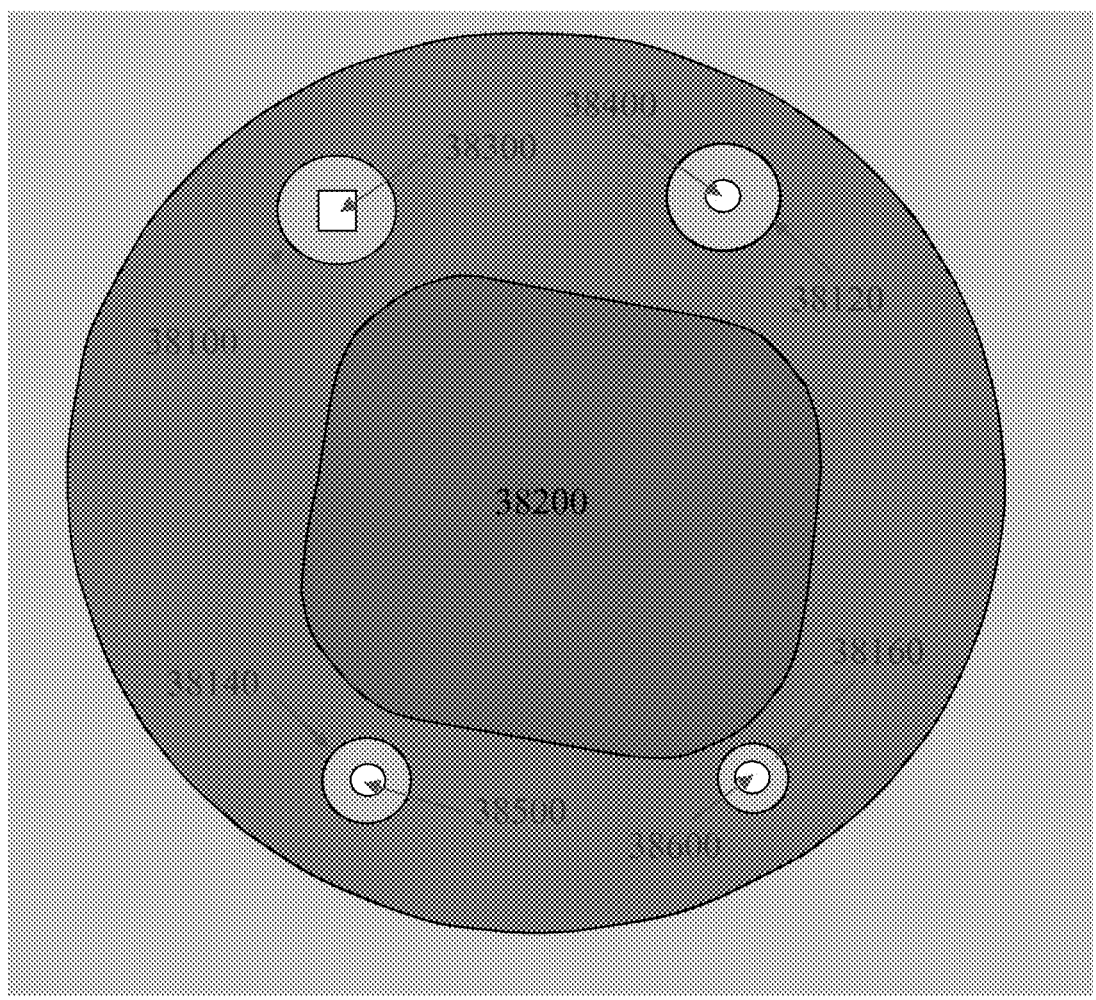

In certain exemplary embodiments first stabilizer bar 1200 can:

comprise a pressure sensor (see, e.g., sensor 38300 of FIG. 38);

comprise a temperature sensor (see, e.g., sensor 38300 of FIG. 38);

comprise a spark plug (see, e.g., plug 38400 of FIG. 38);

comprise a glow plug (see, e.g., plug 38400 of FIG. 38);

define a laser port (see, e.g., port 38500 of FIG. 38);

define an observation port (see, e.g., port 38500 of FIG. 38);

define a gas passageway (see, e.g., passageway 38600 of FIG. 38);

defines a fuel passageway (see, e.g., passageway 38600 of FIG. 38);

be hollow (such as via passageway 38600 of FIG. 38);

be cast into the engine block.

In certain exemplary embodiments, first stabilizer bar can have a different diameter than a second stabilizer bar comprised by the engine (see, e.g., different diameter stabilizer bars of FIG. 38).

In certain exemplary embodiments, the engine can be a diesel engine. In certain exemplary embodiments, the engine has reduced friction between the piston and an engine comprising pistons lacking stabilizer bars. In certain exemplary embodiments, a skirt of the piston does not touch a cylinder of the engine during a full stroke. In certain exemplary embodiments, the piston is beveled. In certain exemplary embodiments, the connecting rod is dished to accommodate the first stabilizer bar as the connecting rod moves in the engine. In certain exemplary embodiments, the piston lacks an oil ring. In certain exemplary embodiments, a skirt of the piston is over than 3 inches in length at a skirt of the piston. In certain exemplary embodiments, a skirt of the piston is less than 2.8 inches in length. In certain exemplary embodiments, a skirt of the piston is less than 1.1 inches in length. In certain exemplary embodiments, the piston weighs over 32 ounces. In certain exemplary embodiments, the piston weighs over 12 ounces. In certain exemplary embodiments, the piston weighs less than 12 ounces. In certain exemplary embodiments, the piston is constructed to receive three piston rings. In certain exemplary embodiments, the first stabilizer bar has a nominal diameter of 0.375 inches. In certain exemplary embodiments, the first stabilizer bar has a nominal diameter of 0.5 inches. In certain exemplary embodiments, a top ring of the piston is gapless.

Certain exemplary embodiments comprise:
piston head 1100;
connecting rod 1300 coupled to piston head 1100;
first stabilizer bar 1200;
second stabilizer bar 1210;
a retaining ring 1520; and
stabilizer bar collar 1500, which defines a pair of bushed apertures first bushed aperture 1510 and second bushed aperture 1515), first bushed aperture 1510 of the pair of bushed apertures constructed to receive first stabilizer bar 1200, a second bushed aperture 1515 of the pair of bushed apertures constructed to receive second stabilizer bar 1210, wherein stabilizer bar collar 1500 is constructed to hold first stabilizer bar 1200 and second stabilizer bar 1210 in a substantially vertical orientation relative to a crankshaft on an engine comprising piston head 1100, stabilizer bar collar 1500 defining a groove 1525, groove 1525 constructed to receive retaining ring 1520, wherein when placed in groove 1525 in stabilizer bar collar 1500, retaining ring 1520 allows stabilizer bar collar 1500 to turn, but not move up or down in an engine cylinder of the engine (see, e.g., engine cylinder 3200 of engine block 3100 of FIG. 3B).

Figure 2:
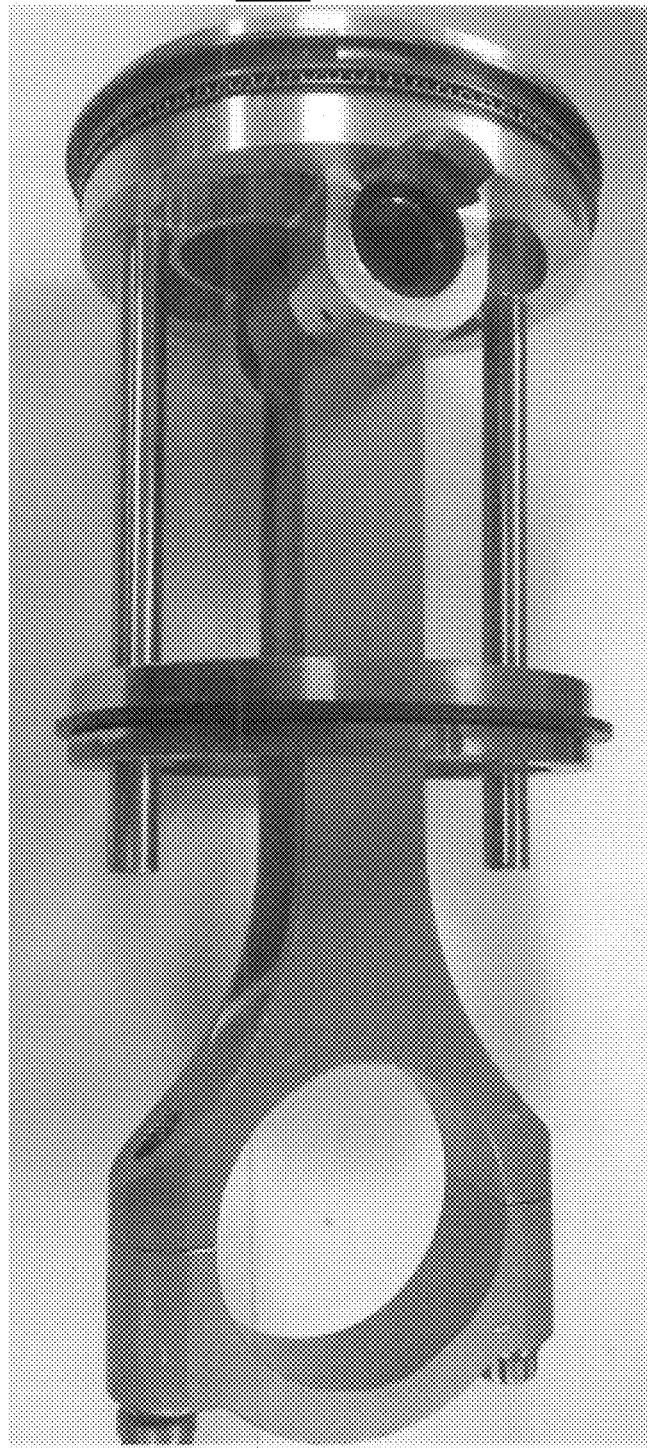

FIG. 2 is a photograph of a perspective view of an exemplary embodiment of a piston assembly 2000.

FIG. 3A, FIG. 3B, and FIG. 3C are side views of an exemplary embodiment of a system 3000. FIG. 3A shows a piston at its apex of travel in an engine cylinder. FIG. 3B shows a piston at its midpoint of travel in an engine cylinder 3200 of an engine block 3100. FIG. 3C shows a piston at its lowest position of travel in an engine cylinder.

Figure 4:
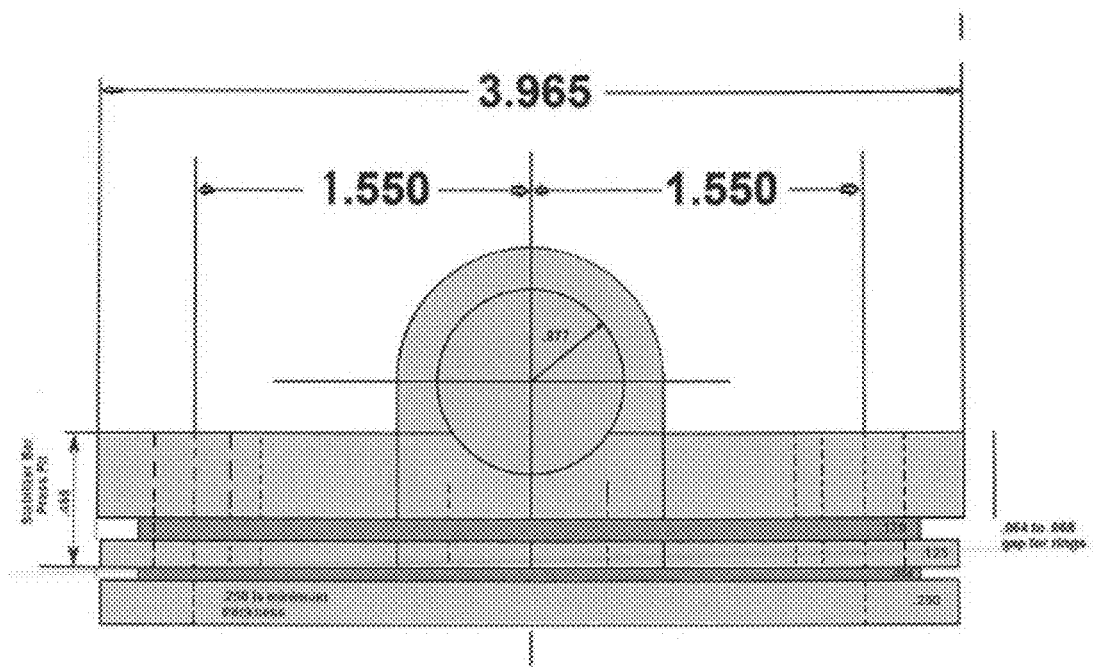

FIG. 4 is a sectional view of an exemplary embodiment of a piston head 4000. The dimensions illustrated are illustrative and can be varied for different engines.

Figure 5:
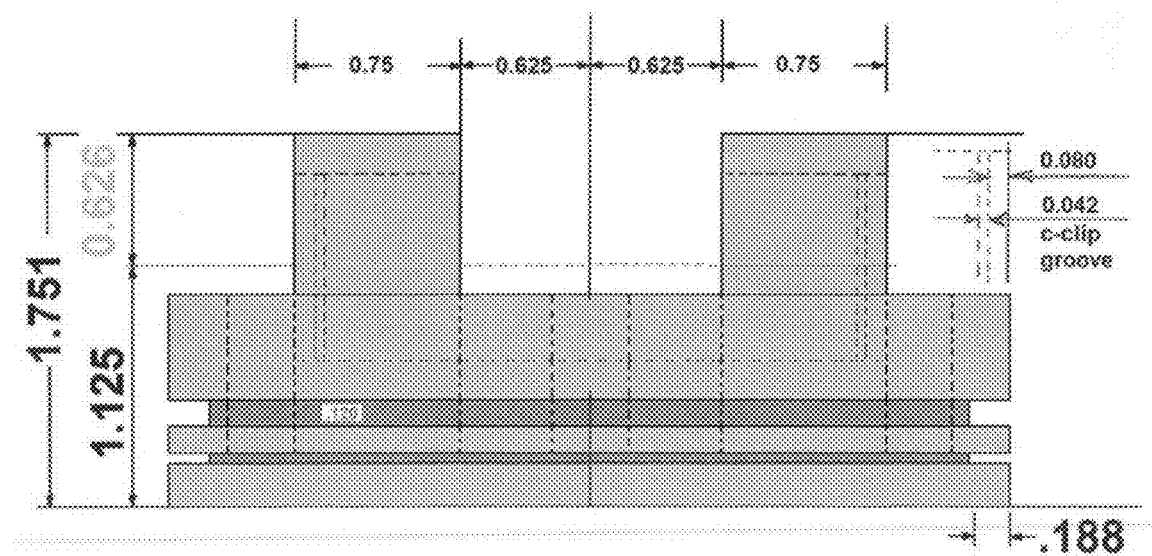

FIG. 5 is a sectional view of an exemplary embodiment of a piston head 5000. The dimensions illustrated are illustrative and can be varied for different engines.

Figure 6:
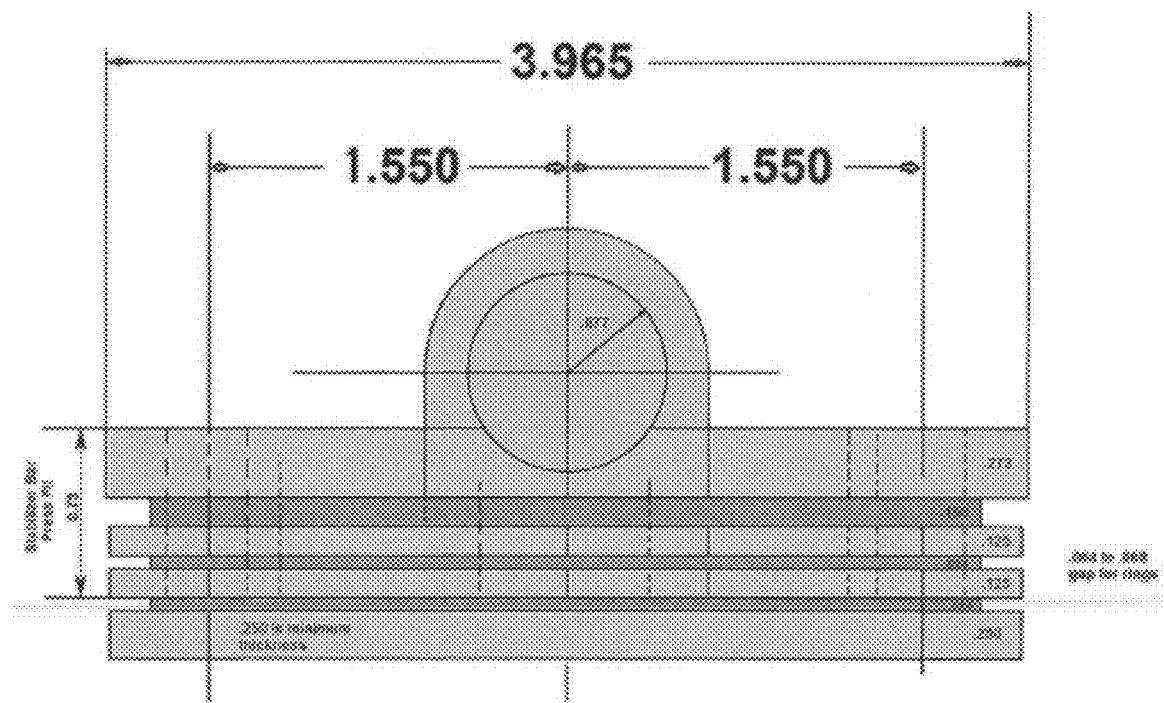

FIG. 6 is a sectional view of an exemplary embodiment of a piston head 6000. The dimensions illustrated are illustrative and can be varied for different engines.

Figure 7:
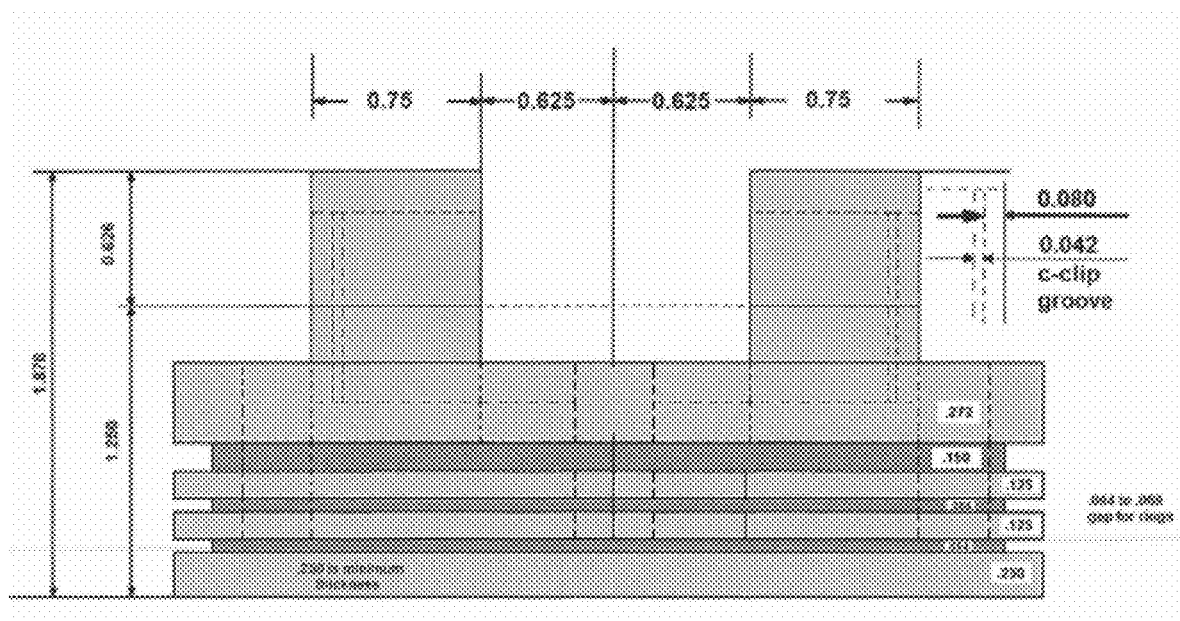

FIG. 7 is a sectional view of an exemplary embodiment of a piston head 7000. The dimensions illustrated are illustrative and can be varied for different engines.

Figure 8:
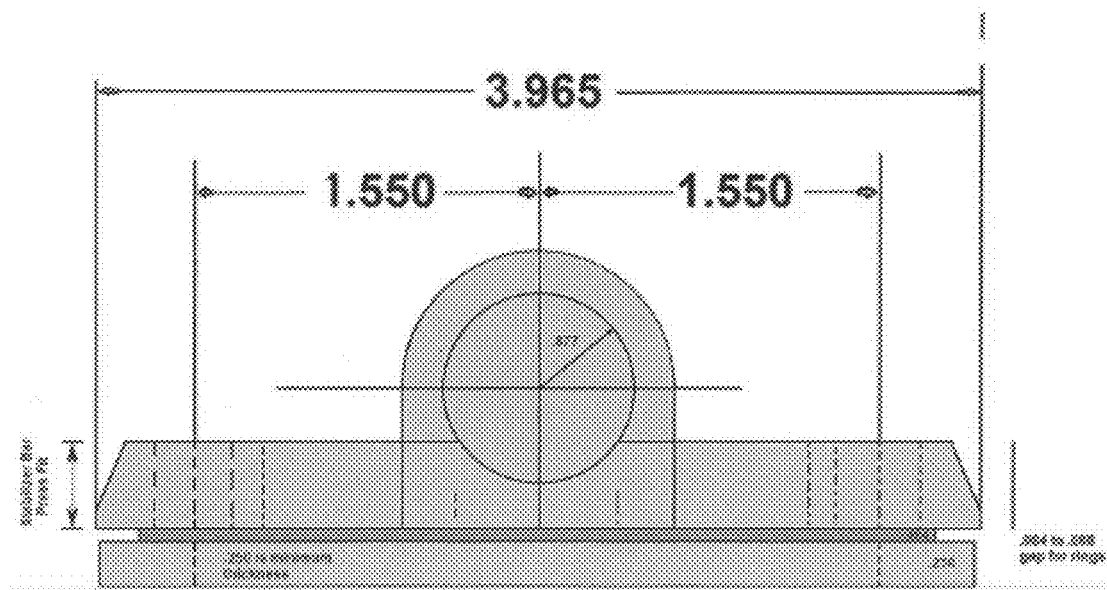

FIG. 8 is a sectional view of an exemplary embodiment of a piston head 8000. The dimensions illustrated are illustrative and can be varied for different engines.

Figure 9:
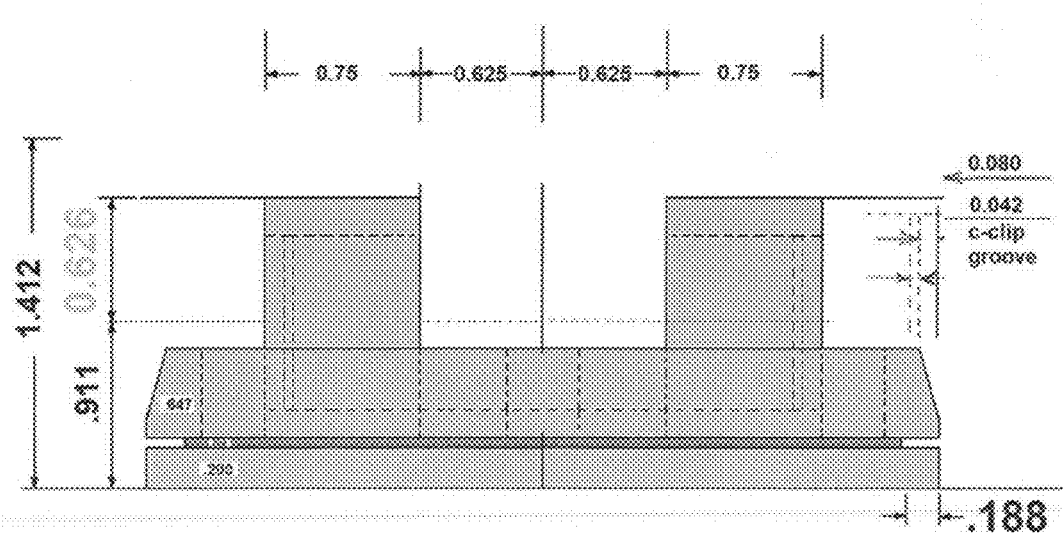

FIG. 9 is a sectional view of an exemplary embodiment of a piston head 9000. The dimensions illustrated are illustrative and can be varied for different engines.

Figure 10:
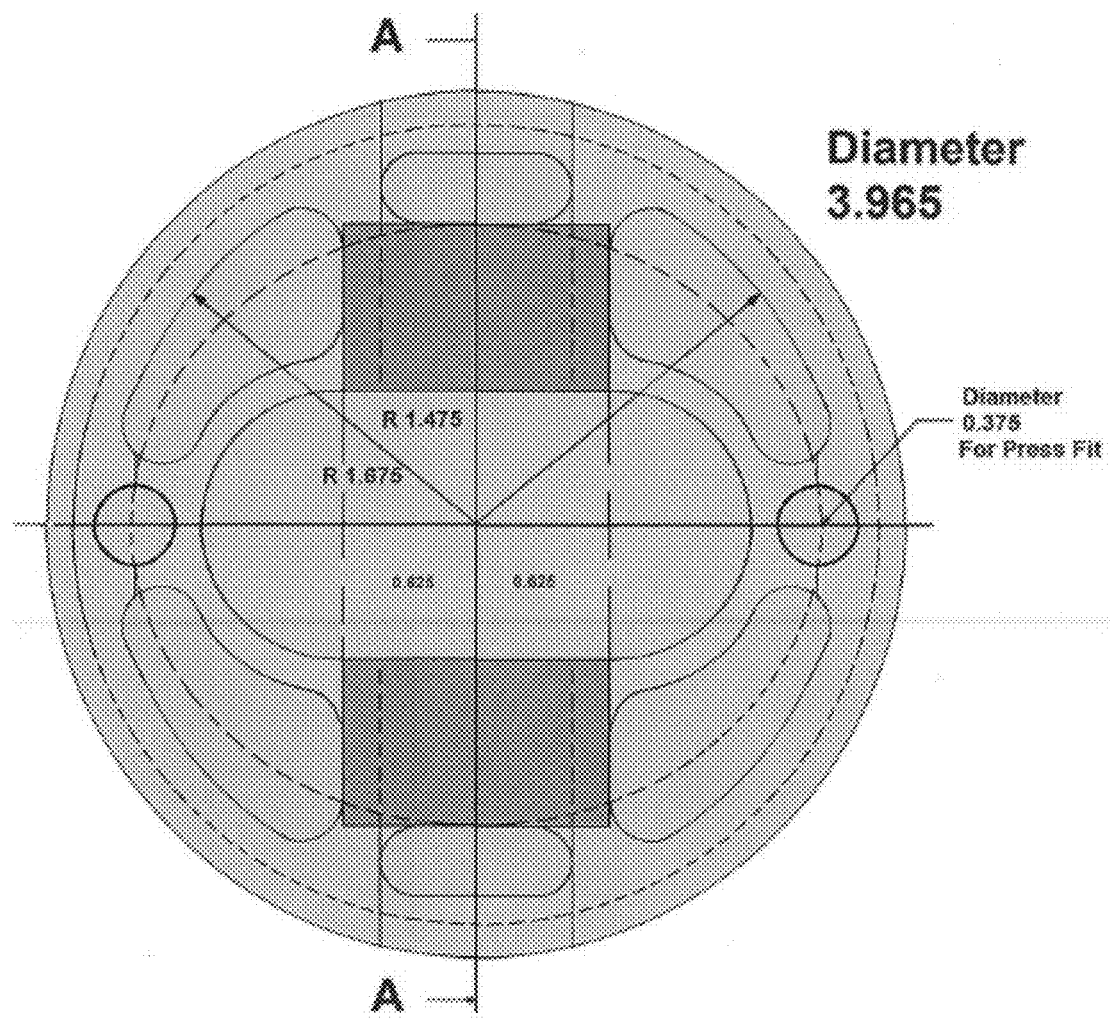

FIG. 10 is a sectional view of an exemplary embodiment of a piston head 10000. The dimensions illustrated are illustrative and can be varied for different engines.

Figure 11:
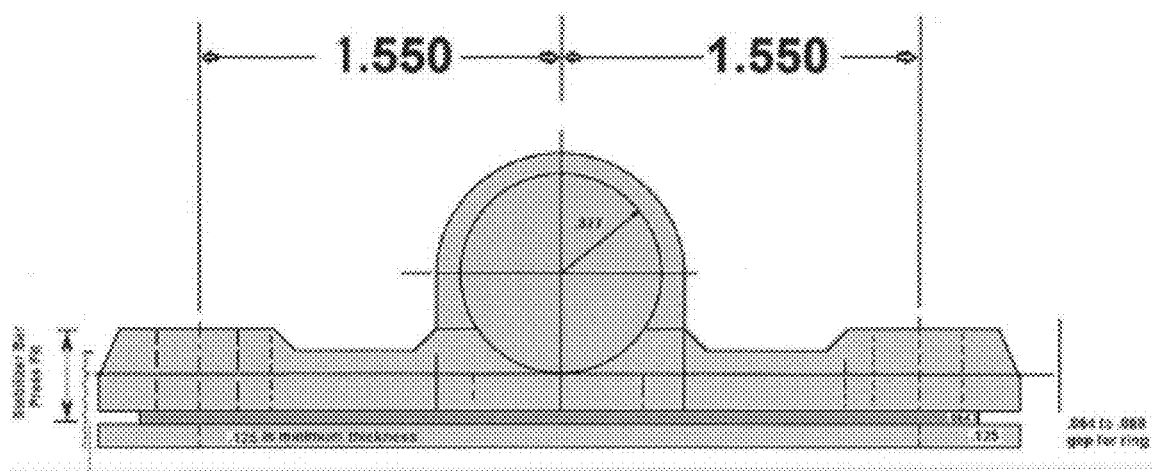

FIG. 11 is a sectional view of an exemplary embodiment of a piston head 11000. The dimensions illustrated are illustrative and can be varied for different engines.

Figure 12:
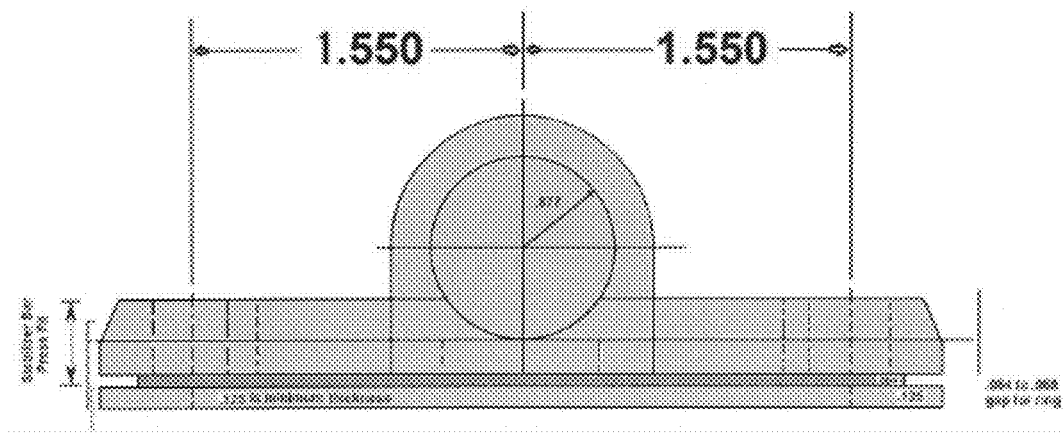

FIG. 12 is a sectional view of an exemplary embodiment of a piston head 12000. The dimensions illustrated are illustrative and can be varied for different engines.

Figure 13:
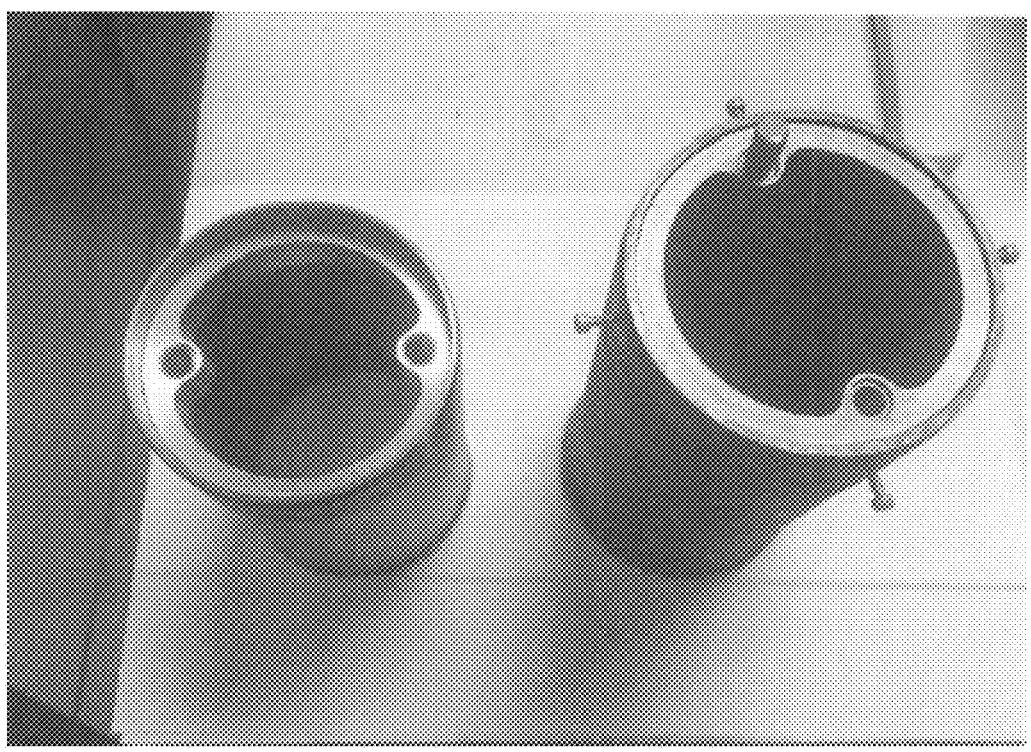

FIG. 13 is a photograph of a perspective view of exemplary embodiments of engine cylinder sleeves 13000.

Figure 14:
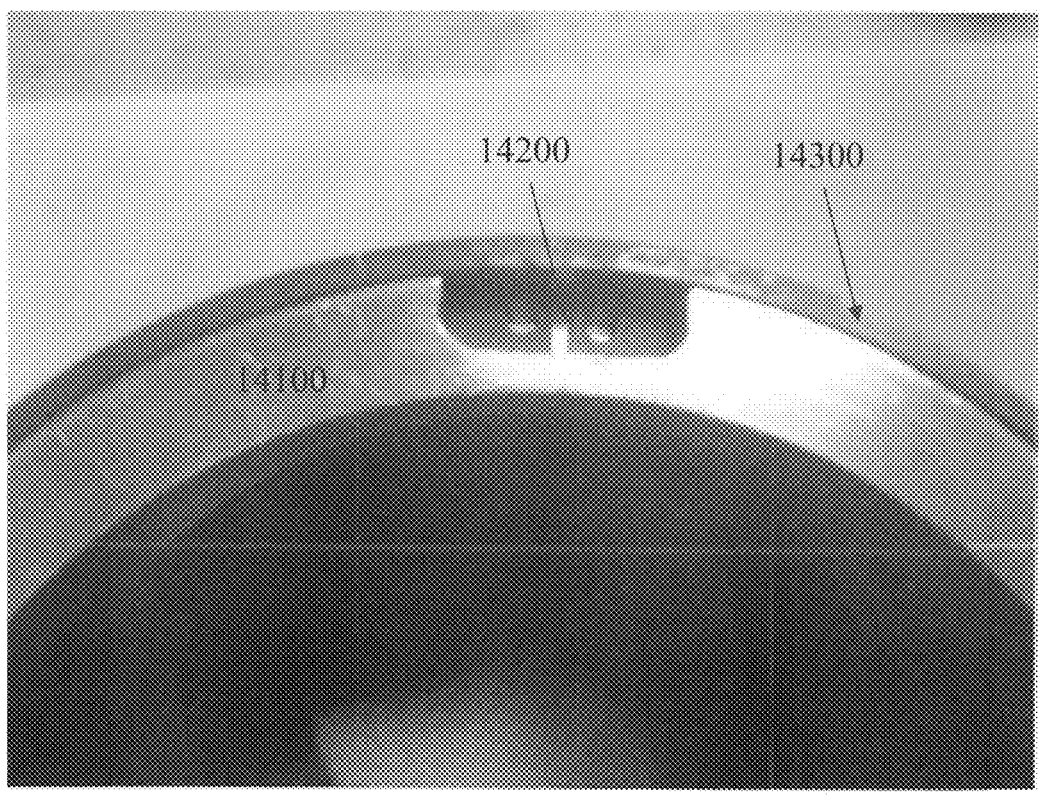

FIG. 14 is a photograph of a perspective view of an exemplary embodiment of a portion of an engine cylinder sleeve 14000. A retaining collar 14100 defines a notch 14200, which notch can be utilized for nondestructive removal or retaining collar 14100 from an engine cylinder sleeve 14300

Figure 15:
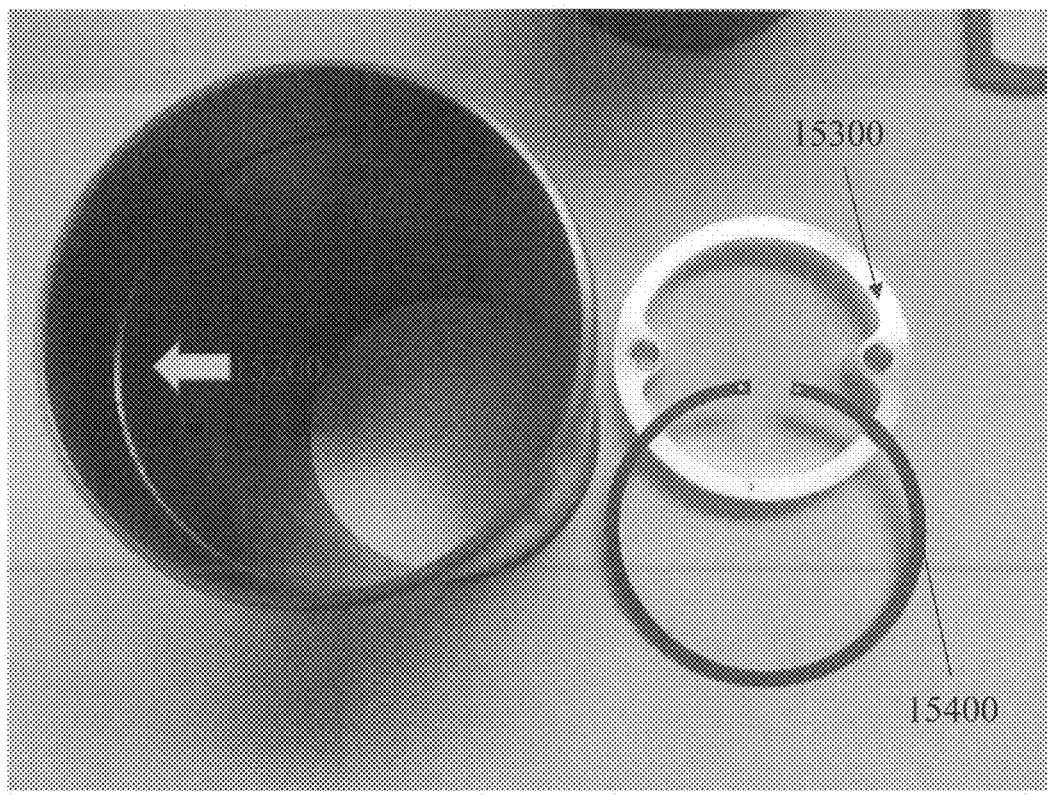

FIG. 15 is a photograph of a perspective view of an exemplary embodiment of a system 15000. A groove 15200, such as a groove having a depth greater than approximately 0.005 inches, can be machined into an inside service of cylinder sleeve 15100. A retaining collar 15300 and retaining ring 15400 are also illustrated.

Figure 16:
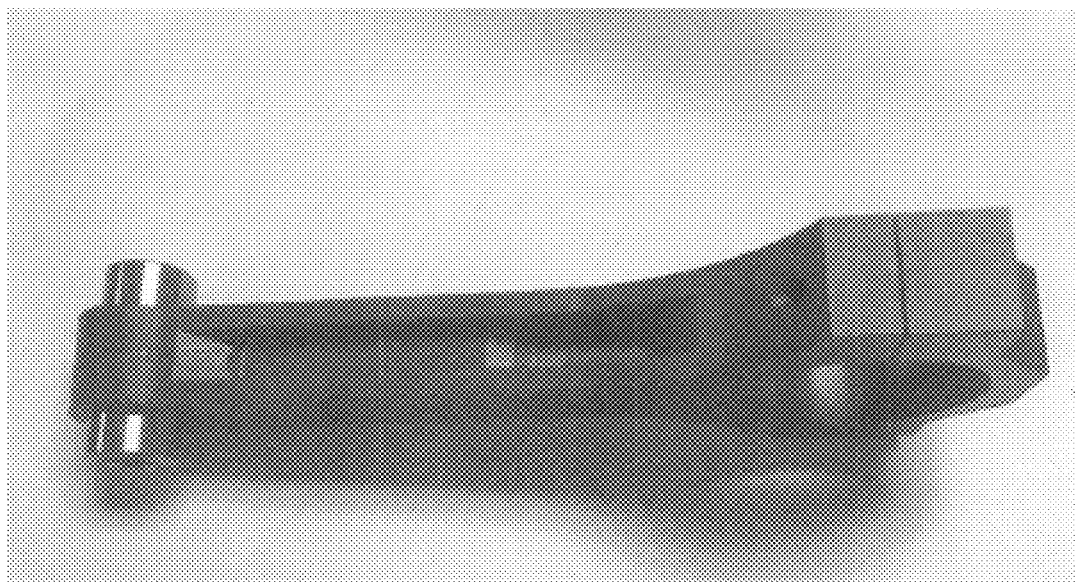

FIG. 16 is a photograph of a perspective view of an exemplary embodiment of a connecting rod 16000. As illustrated, a stabilizer bar fits into the gap in connecting rod 16000. Certain exemplary embodiments can utilize titanium as a material.

Figure 17:
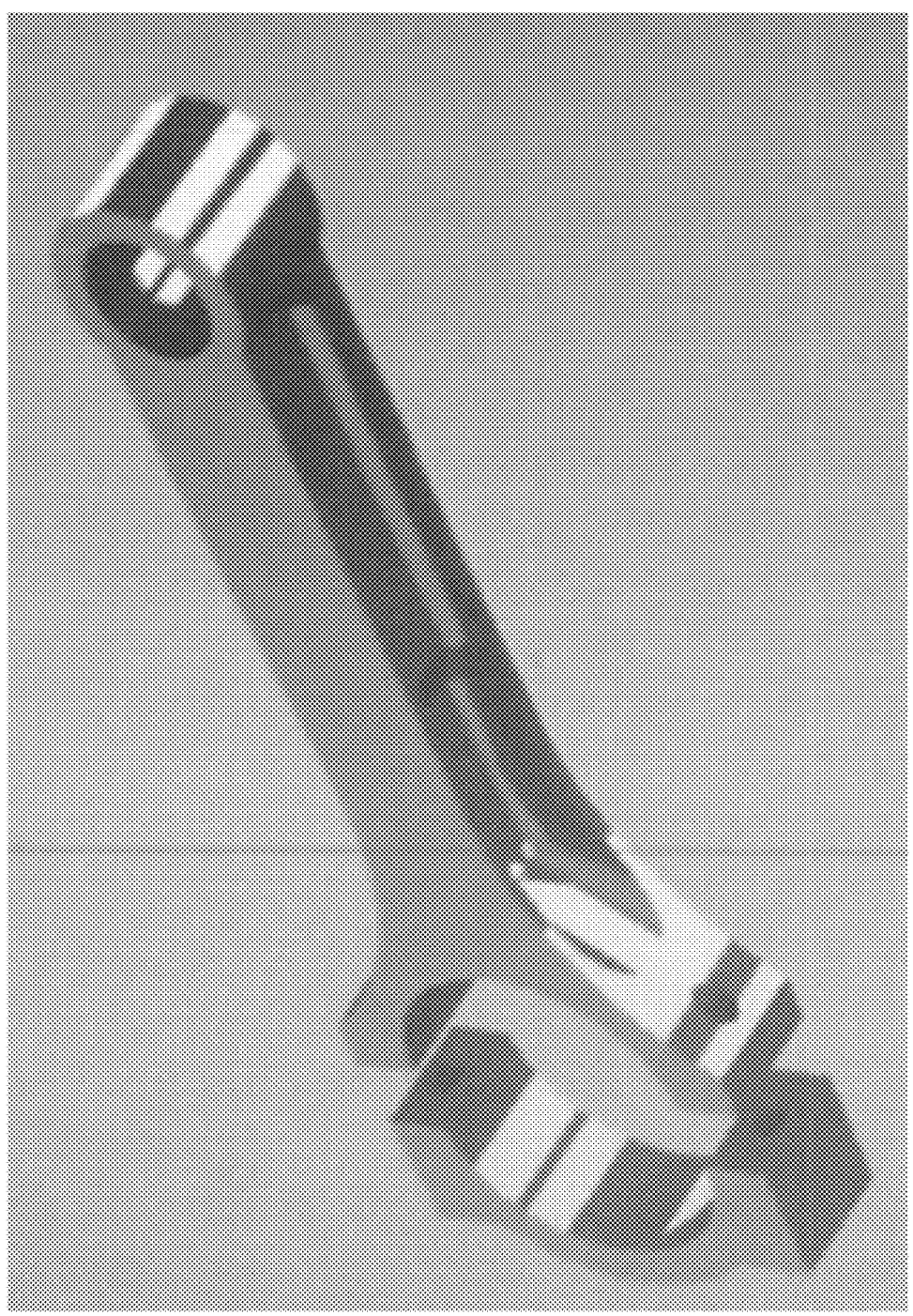

FIG. 17 is a photograph of a perspective view of an exemplary embodiment of a connecting rod 17000. Connecting rod 17000 defines grooves that allow stabilizer bars to move during a stroke of a piston coupled to connecting rod 17000 without contacting connecting rod 17000.

Figures 18A, 18B:
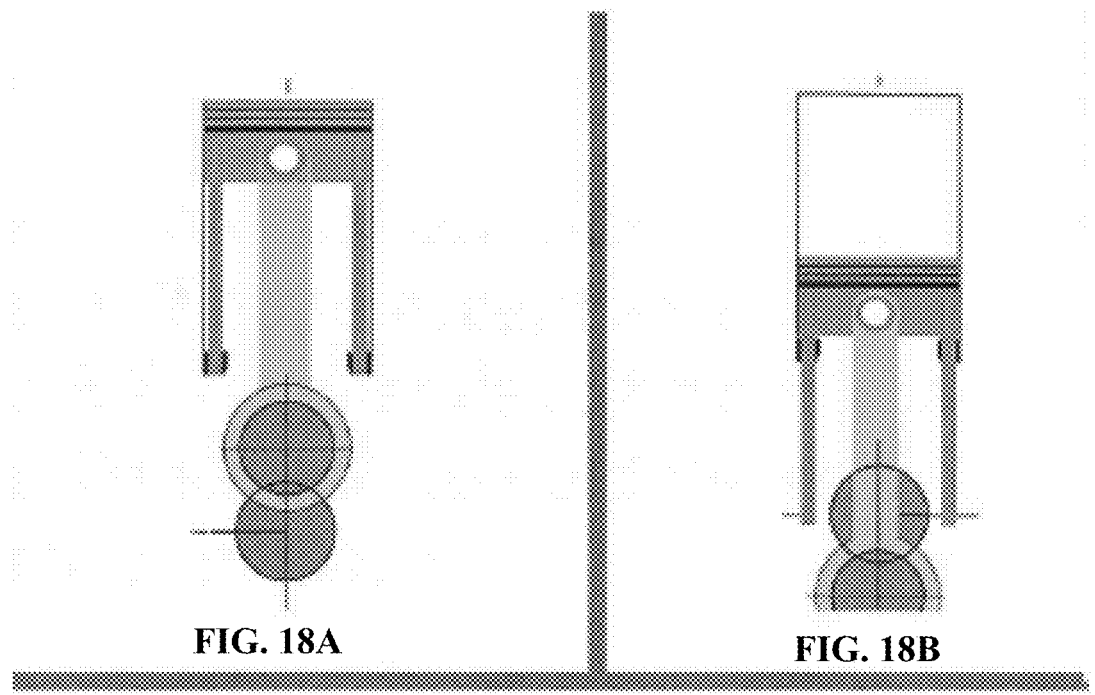
Figure 18C:
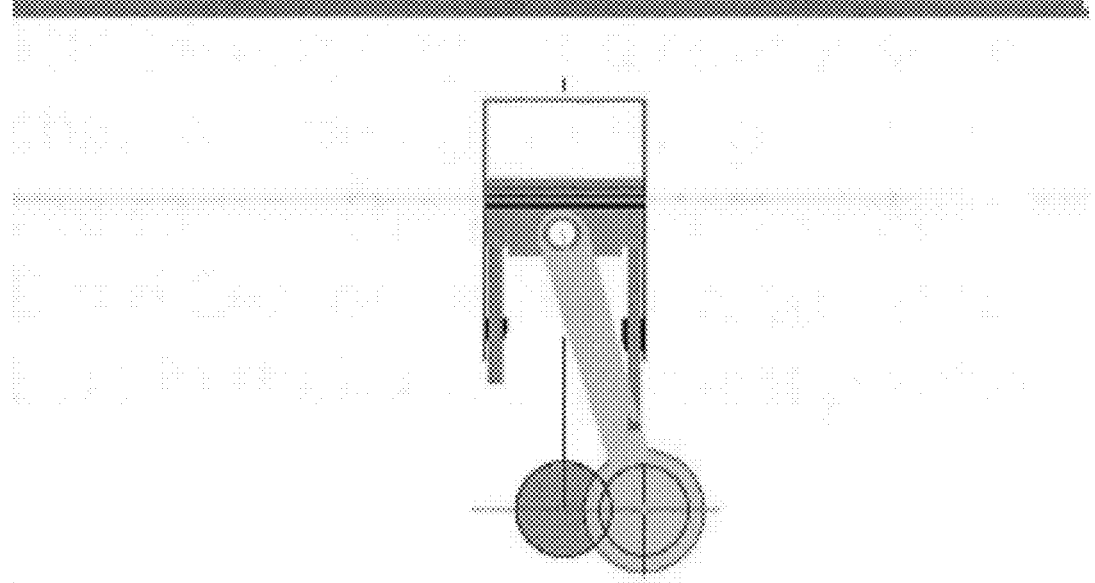

FIG. 18A, FIG. 18B, and FIG. 18C are side views of an exemplary embodiment of a system 18000. FIG. 18A illustrates a piston at a Top Dead Center position, which shows stabilizer bars in their most vertical position. FIG. 18A illustrates a piston at a Bottom Dead Center position, which shows the stabilizer bars in their least vertical position. This illustrates that the stabilizer bars can extend below a top of a crankshaft of an engine comprising the piston. FIG. 18C illustrates a stabilizer bar moving into a groove defined in the illustrated connecting rod. Without the grooves, there would be interference between one of the illustrated stabilizer bars and the connecting rod. Grooves defined by the connecting rod allow the stabilizer bars to move without contacting the connecting rod.

Figure 19:
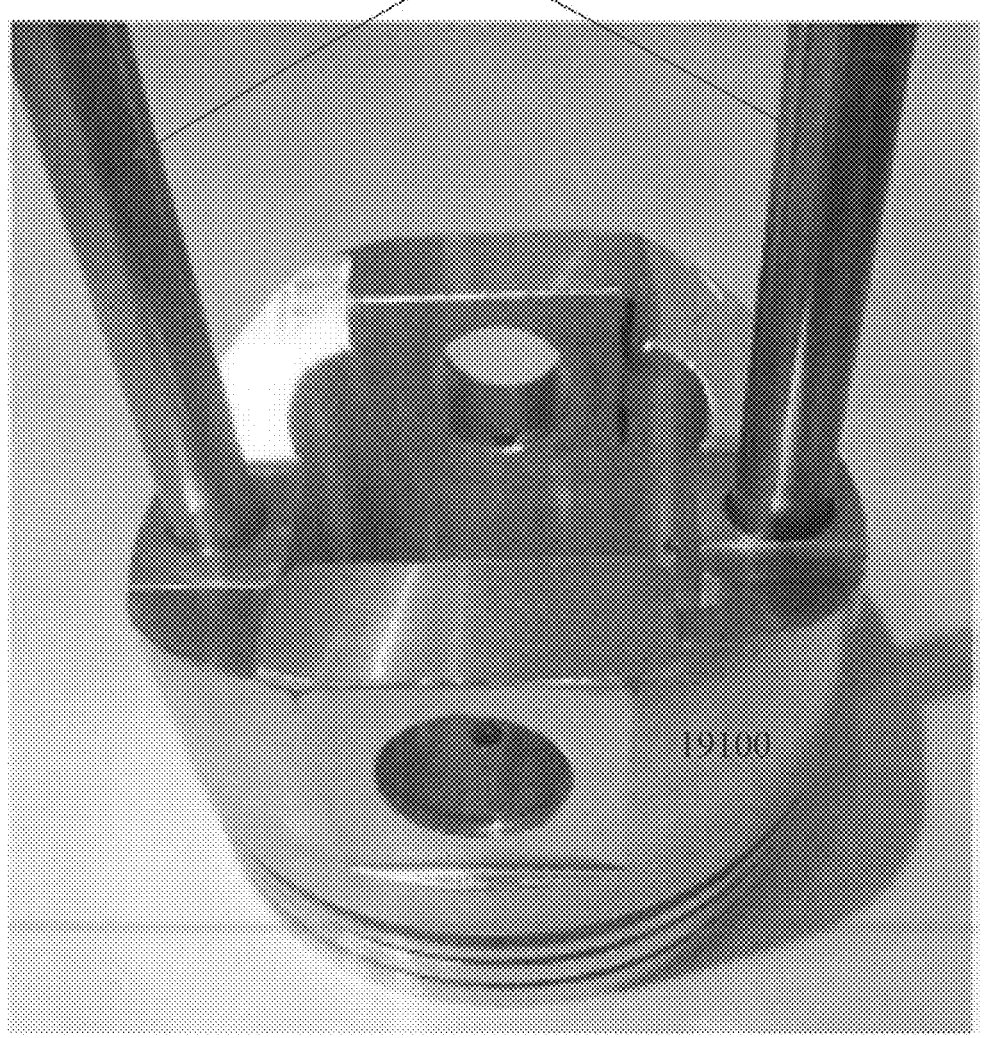

FIG. 19 is a photograph of a perspective view of an exemplary embodiment of a piston assembly 19000. Piston assembly 19000 comprises a piston head 19100 and two stabilizer bars 19200. Titanium wrist pins can be utilized with two stabilizer bars 19200, which can also be titanium. Each component can have a special coating to reduce friction and wear.

Figure 20:
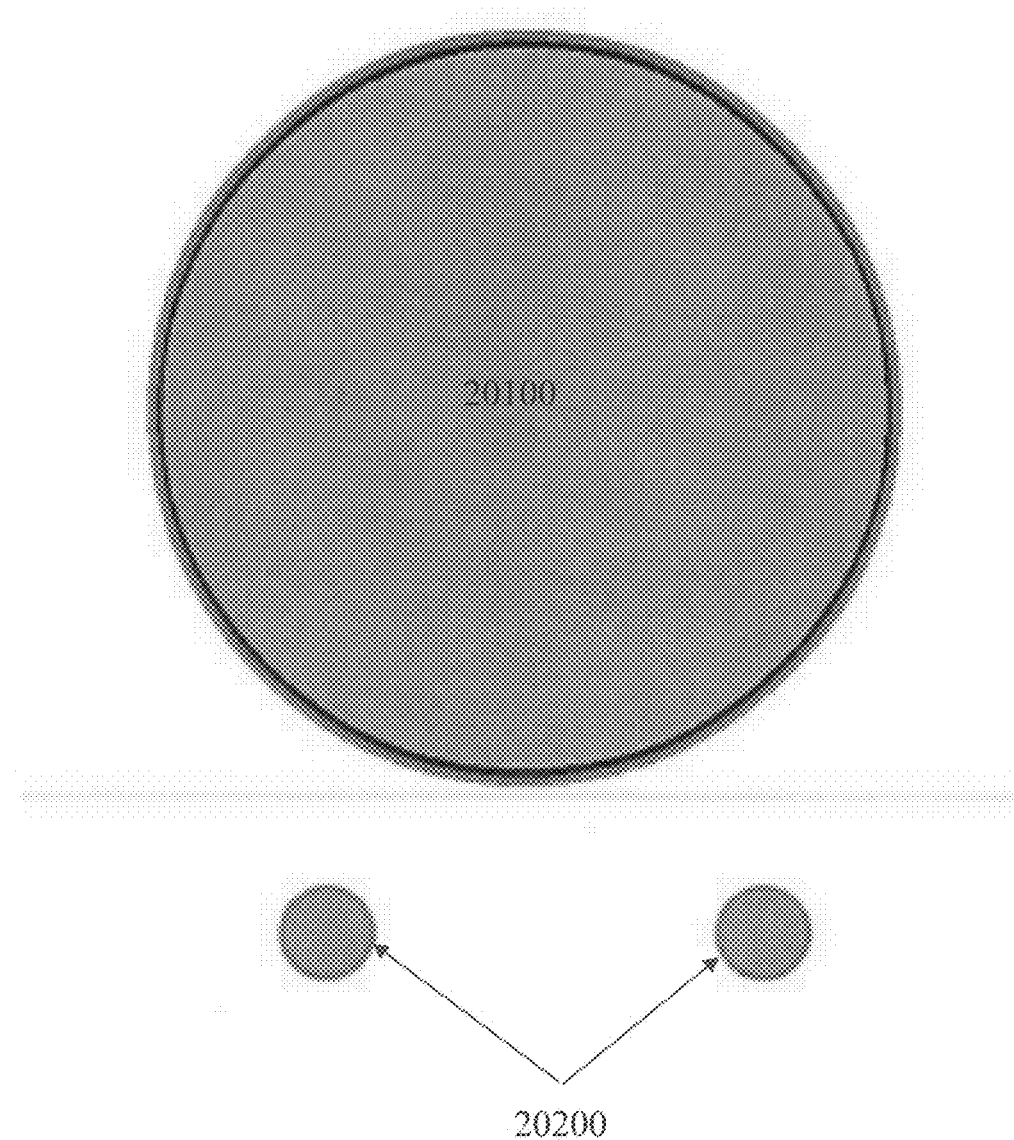

FIG. 20 is a photograph of a perspective view of an exemplary embodiment of a system 20000. System 20000 comprises a piston 20100 and two stabilizer bars 20200. Piston 20100 can be a nominal four inch diameter piston and can be placed in a cylinder that has a surface honed to hold oil. Honing the surface can change the coefficient of friction between the cylinder and piston 20100. Two stabilizer bars 20200 can be a nominal three-eighths inches in diameter or any other diameter selected. Stabilizer bars 20200 can be coated with diamond like coatings to reduce friction. A retainer plate that two stabilizer bars 20200 pass through can have brass bushings that are lubricated for low friction.

Figure 21:
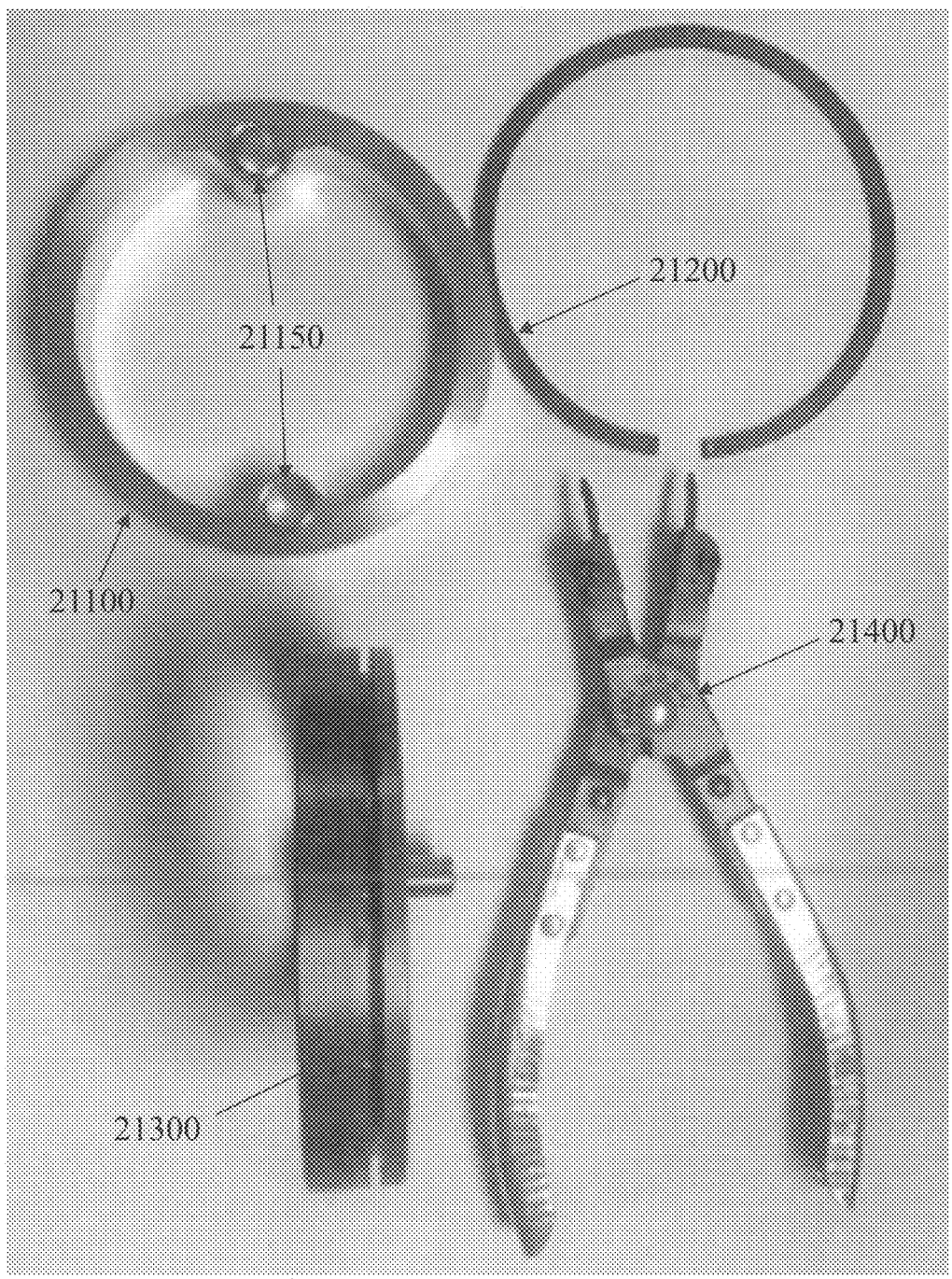

FIG. 21 is a photograph of a perspective view of an exemplary embodiment of a system 21000. System 21000 comprises a retainer collar 21100, a retainer ring 21200, a piston head 21300, and a removal tool 21400. Retainer collar 21100 is designed so that it can be easily removed using removal tool 21400 (e.g., standard 'C' ring pliers). Retainer ring 21200 can be a standard piston compression ring with holes drilled in the ends. Retainer ring 21200 allows retainer collar 21100 to turn, but not to move up or down in a cylinder. Bushings 21150 in retainer collar 21100 hold stabilizer bars in a vertical position.

Retainer collar 21100 has a single custom piston ring installed the same as a standard piston ring except it has two holes that allow removal. A groove (e.g., a groove having a depth greater than approximately 0.005 inches) is cut in the cylinder wall to accommodate the ring. The ring clicks in place just as prior art piston rings click in place. The stabilizer bars pass thru bushings.

Figure 22A:
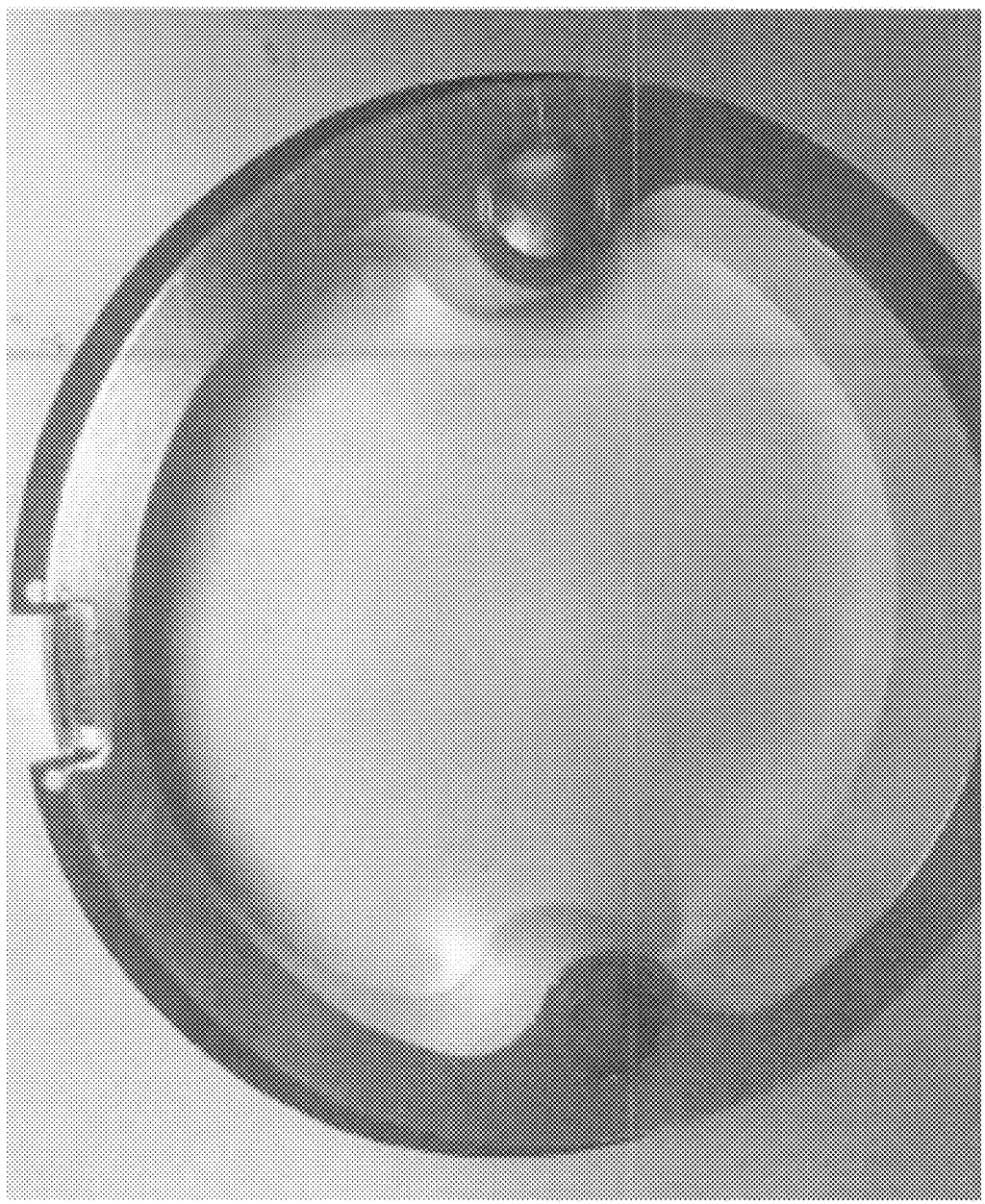
FIG. 22A is a photograph of a perspective view of an exemplary embodiment of a portion of a retainer collar 22000.

FIG. 22A is a photograph of a perspective view of an exemplary embodiment of a portion of a retainer collar 22000. Retainer collar 22000 is machined to have an opening to allow a tool to remove retainer collar 22000. Two apertures defined by retainer collar 22000 are constructed to receive c-plier ends for removal from an exemplary engine cylinder. Retainer collar 22000 utilizes a click in place ring.

Figure 22B:
FIG. 22B is a photograph of a perspective view of an exemplary embodiment of a portion of a retainer collar 22500.

FIG. 22B is a photograph of a perspective view of an exemplary embodiment of a portion of a retainer collar 22500. Retainer collar 22500 has been constructed to have inside relief for a connecting rod.

Figure 23:
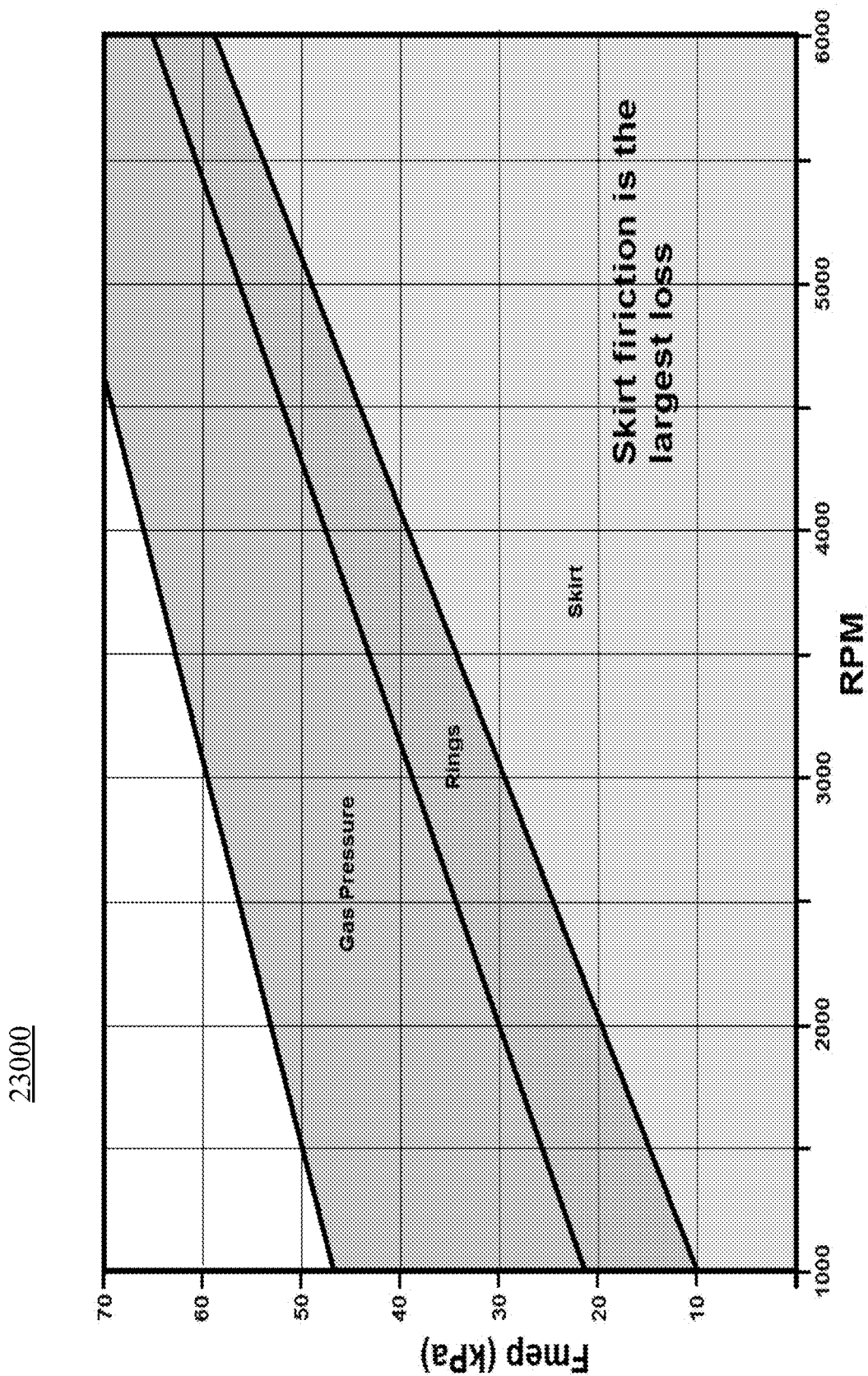

FIG. 23 is a graph 23000, which illustrates friction mean effective pressure ("FMEP") as a function of engine rotational speed for an exemplary internal combustion engine.

Figure 24:
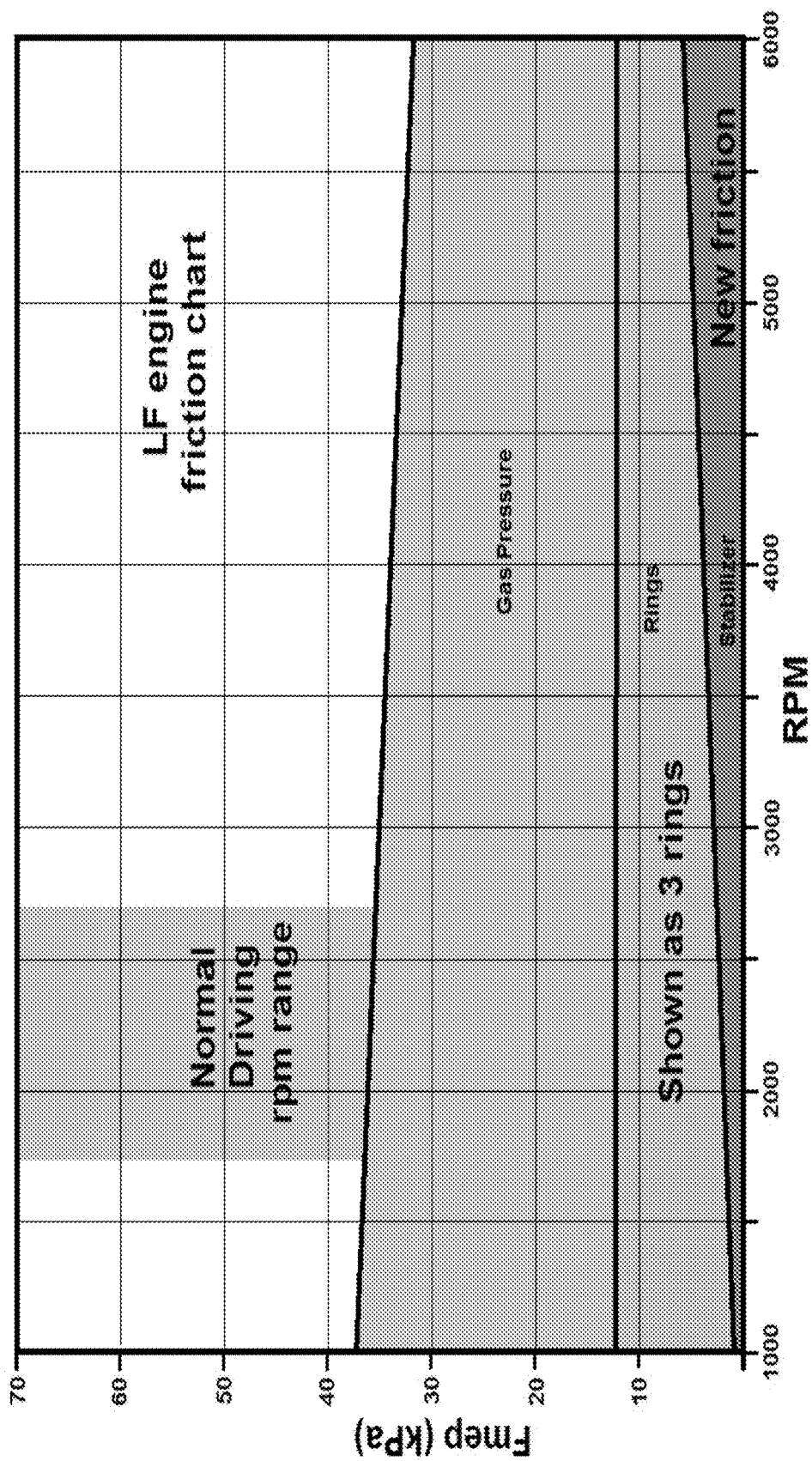

FIG. 24 is a graph 24000, which illustrates friction mean effective pressure ("FMEP") as a function of engine rotational speed for an exemplary internal combustion engine fitted with a stabilizer bar in accordance with an exemplary embodiment.

Certain exemplary embodiments substantially eliminate "tilting" of the pistons so that the skirts never touch the cylinder walls and so the rings can't 'bite' into the cylinder wall. Certain exemplary embodiments add one or more stabilizer bars to the piston and eliminate the piston skirt. This reduces friction while maintaining or reducing a weight of the piston.

Certain exemplary embodiments increase gasoline engines efficiencies by between, for example approximately 15%, 30%, or 45%, etc. Such improvements can reduce gasoline consumption and gaseous emissions by, for example, approximately one third. Reduced friction of piston rings and piston skirts can be achieved without increasing costs for new engines. In addition, certain exemplary embodiments can be retrofitted to existing pistons. Certain exemplary embodiments can reduce piston height and weight without increasing cost.

Certain exemplary embodiments can be relatively easy to install. Certain exemplary embodiments can be utilized on engines of all fuel types and all engine types. For example, exemplary embodiments can be utilized on gasoline, diesel, two stroke, compressor, and/or alternative fuel engines. Certain exemplary embodiments can be utilized for cars, trucks, motorcycles, airplanes, lawn mowers, farm equipment, and/or boats, etc.

Certain internal combustion engines utilize cast aluminum three-ring pistons. The pistons comprise a skirt is designed to keep the piston from tilting in the cylinder. A top ring is a compression ring and the piston utilizes a second ring because of a gap in the top ring. An oil ring set is utilized to get oil on the cylinder wall. The oil ring set is utilized because the piston skirt shadows part of the cylinder. Certain pistons (e.g., a 1963 Ford F300 9:1 piston) utilize an aluminum case that is approximately 3.375 inches high at a skirt and weighs approximately twenty-four ounces. Certain pistons (e.g., a 2006 Ford F300 high efficiency concept piston) utilize an aluminum case that is approximately 2.79 inches high at a skirt and weighs approximately eighteen ounces. Pistons utilized for hydrogen engines can utilize similar pistons with higher compression (e.g., approximately 11:1) and can utilize a full floating wrist pin.

Certain internal combustion engines utilize pistons that comprise two connecting rods. Such embodiments can be made from an aluminum billet with a height of approximately 2.65 inches at the skirt. Such embodiments can weigh approximately twenty-one ounces. Such embodiments can reduce friction in engine cylinders by one half or more.

Figure 25:

FIG. 25 is a photograph of a perspective view of an exemplary embodiment of a piston head 25000. Certain exemplary embodiments can utilize three piston rings similar to other pistons. Certain exemplary embodiments, such as those utilizing piston head 25000, can utilize stabilizer bars that are between approximately 0.375 inches and 0.50 inches in diameter. Certain exemplary embodiments lack a piston skirt. Such embodiments can be made from an aluminum billet, have a height of approximately 1.00 inches, and weigh approximately 12.5 ounces.

Figure 26:

FIG. 26 is a photograph of a perspective view of an exemplary embodiment of a piston head 26000. Certain exemplary embodiments, such as those utilizing piston head 26000, can utilize a gapless top ring. Such embodiments can utilize two rings: (1) the gapless top ring, and (2) an oil ring. Such embodiments can be approximately 0.88 inches and weigh approximately 11.5 ounces.

Figure 27:
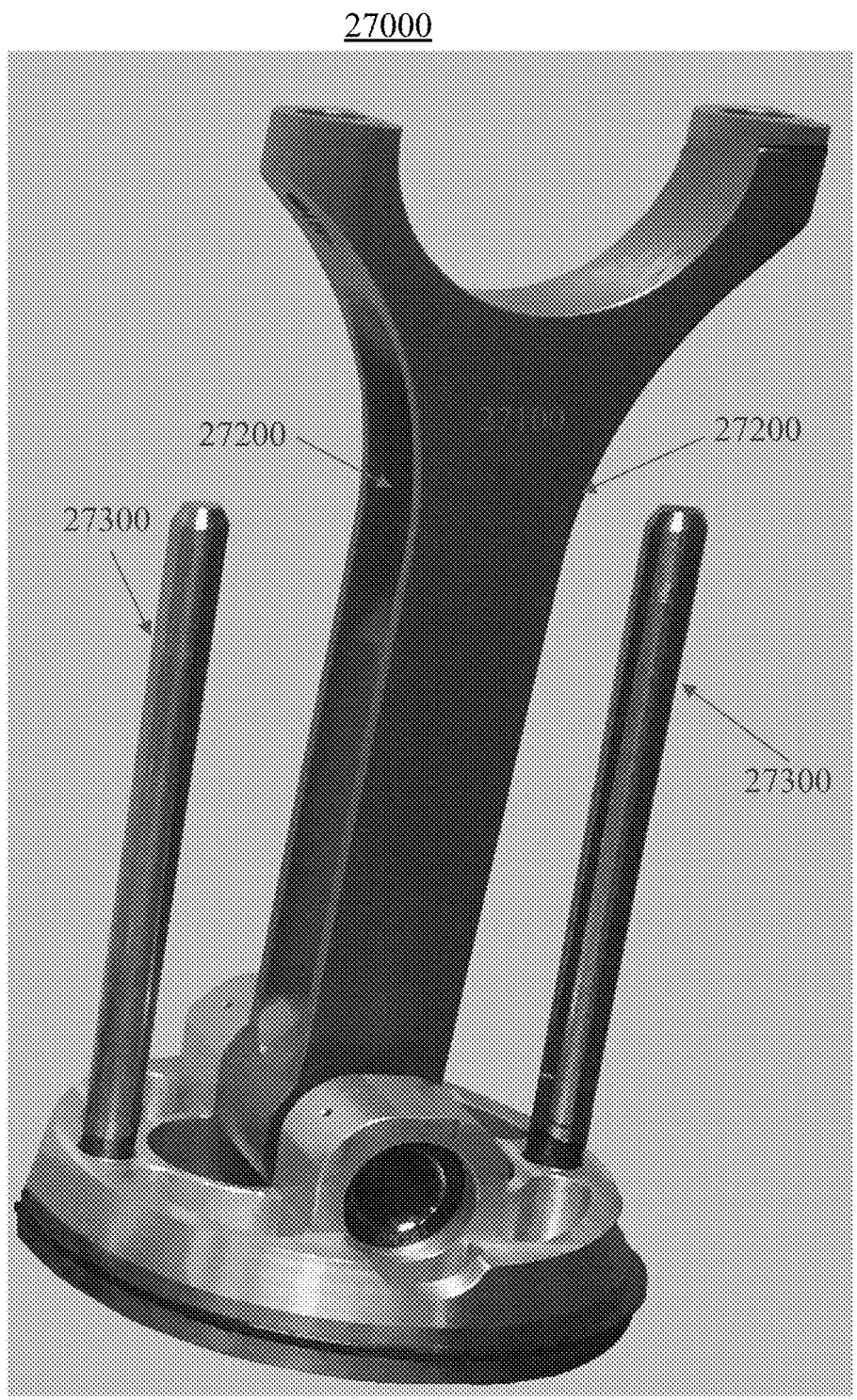

FIG. 27 is a photograph of a perspective view of an exemplary embodiment of a stabilized piston assembly 27000. Connecting rod 27100 defines a pair of opposing channels 27200. Pair of opposing channels 27200 is constructed to allow one or more stabilizer bars 27300 to not impinge upon connecting rod 27100 during an engine cycle. Certain exemplary embodiments, such as those utilizing piston assembly 27000, can utilize single ring. Such embodiments can utilize a gapless ring and lack an oil ring. Oil gets to the gapless ring by passing by a beveled edge of the piston. In certain exemplary embodiments, one or more stabilizer bars 27300 are rounded on the ends to aid in assembly and increase clearances. Wrist pins can be slightly shorter to reduce weight.

Figure 28:
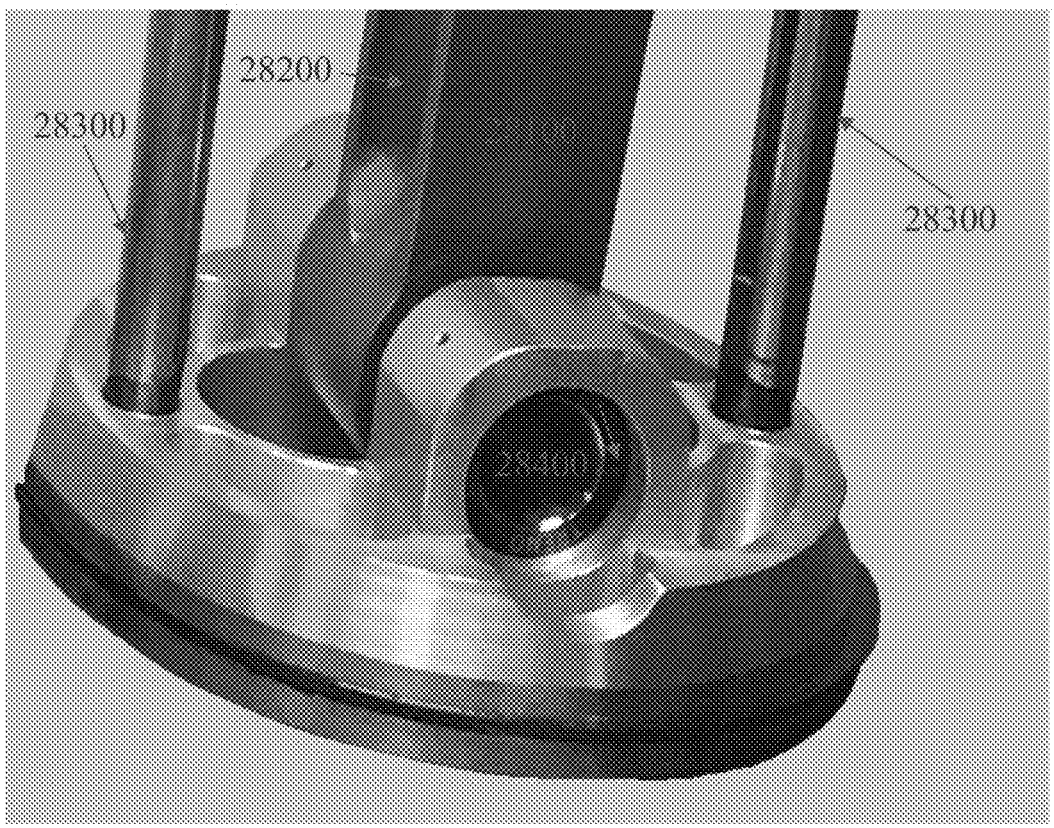

FIG. 28 is a photograph of a perspective view of an exemplary embodiment of a one ring piston head 28000 such as is the piston head used in stabilized piston assembly 27000 of FIG. 27. One ring piston head 28000 is beveled. One ring piston head 28000 is coupled to one or more stabilizer bars 28300. One or more stabilizer bars 28300 are knurled on ends and pressed into the piston. A dished area 28200 of a connecting rod 28100 is illustrated. A wrist pin 28400 is retained by a "C" ring 28500.

Certain exemplary two ring pistons can be made from billet aluminum and can measure approximately 0.88 inches in height at a skirt of the piston and can weigh approximately 11.5 ounces. Certain exemplary one ring pistons can be made from billet aluminum and can measure approximately 0.80 inches in height at a skirt of the piston and can weigh approximately 10.5 ounces.

Figure 29:
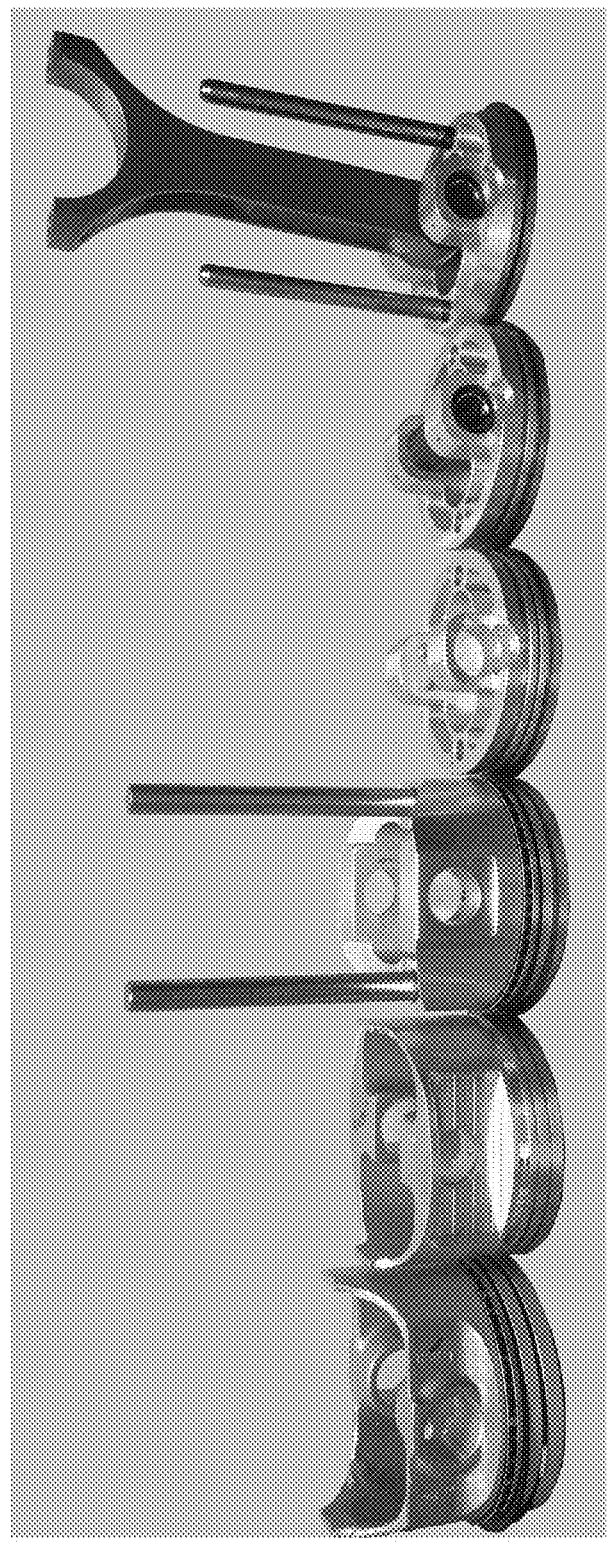

FIG. 29 is a photograph of a perspective view of an exemplary set of pistons and piston assemblies 29000.

Certain exemplary diesel pistons can utilize three rings. Such embodiments can be made from billet aluminum and can measure approximately 4.42 inches in height at a skirt of the piston and can weigh approximately two pounds and five ounces. Certain exemplary one ring diesel pistons can be made from billet aluminum and can measure approximately 3.45 inches in height at a skirt of the piston and can weigh approximately two pounds and one ounce.

Figure 30:

FIG. 30 is a photograph of a perspective view of an exemplary embodiment of a diesel piston 30000. Diesel piston 30000 is a three ring full skirted piston that weighs approximately two pounds and five ounces and is approximately 4.42 inches in height at its skirt.

Figure 31:

FIG. 31 is a photograph of a perspective view of an exemplary embodiment of a diesel piston 31000. Diesel piston 31000 is a three ring partially skirted diesel piston, which weighs approximately pounds and one ounce and is approximately 3.45 inches high. The skirt can be further reduced and the number of rings can be reduced to one.

Figure 32:

FIG. 32 is a photograph of a perspective view of an exemplary embodiment of a diesel piston 32000. Diesel piston 32000 is a one ring partially skirted diesel piston. It weighs approximately one pounds and ten ounces and is approximately 2.54 inches high. The skirt can be further reduced in height.

In summary, certain exemplary embodiments can result in the following improvements:
  The weight of the piston has been reduced from approximately 24 ounces to approximately 10.5 ounces (56.5%).
  The weight of the assembly has been reduced from approximately 31 ounces to approximately 20.5 ounces (33.9%). This includes the piston, rings, wrist pin and stabilizer bars.
  The height of the piston has been reduced from ounces 3.375 inches to ounces 0.8 inches (76.3%).
  The cost of the piston assembly has been reduced by approximately 19.5%.
  Friction losses measured statically are improved by 50% or greater.

Figure 33:
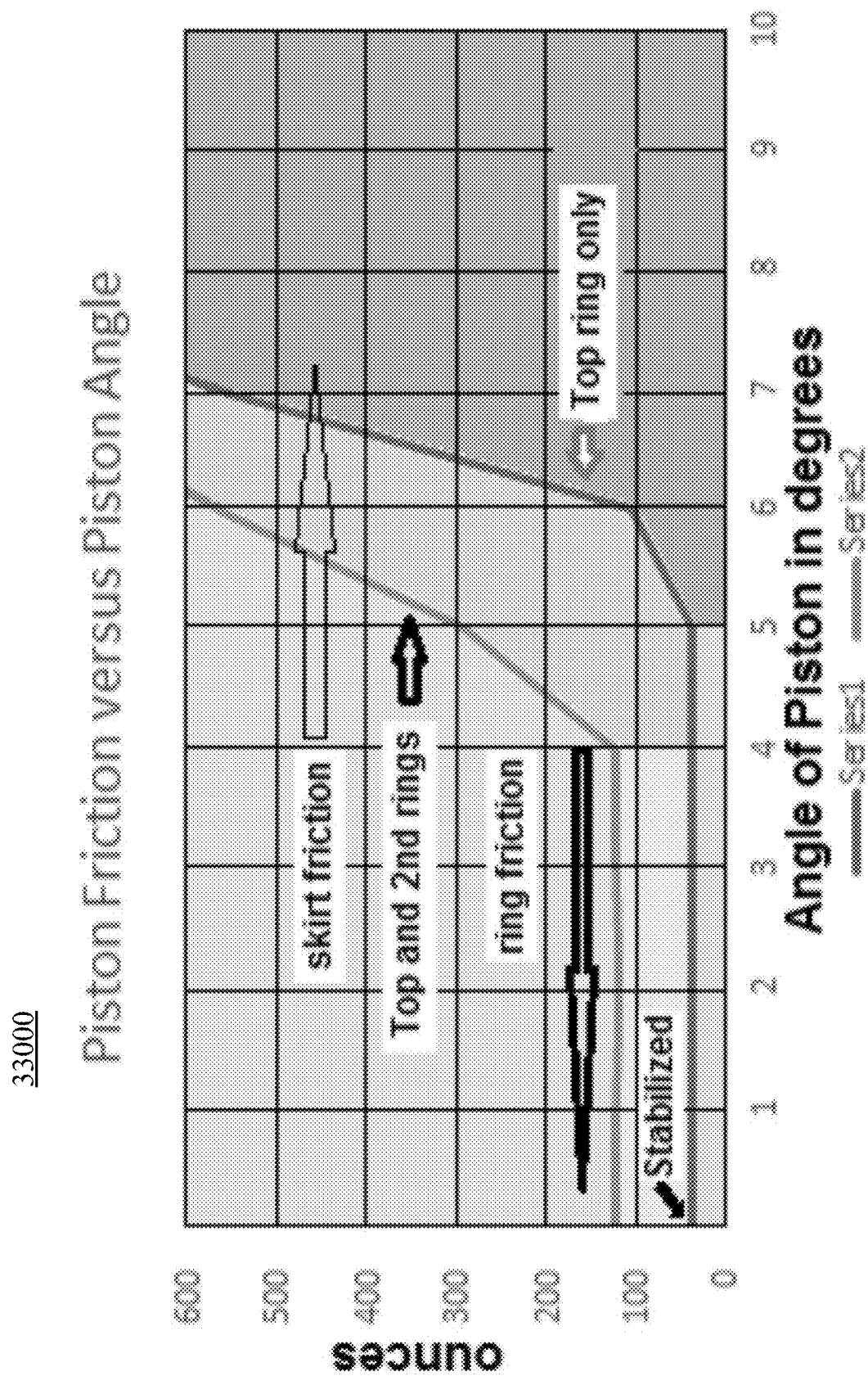

FIG. 33 is a graph 33000, which illustrates friction increases with piston angle. When a piston skirt touches a cylinder wall, friction increases dramatically. Oil ring friction losses are not shown. Friction losses for the illustrated piston and ring combination are approximately ⅔ of those for a compression ring. As engine rpm increases, piston skirts contribute more to friction losses.

Figure 34:
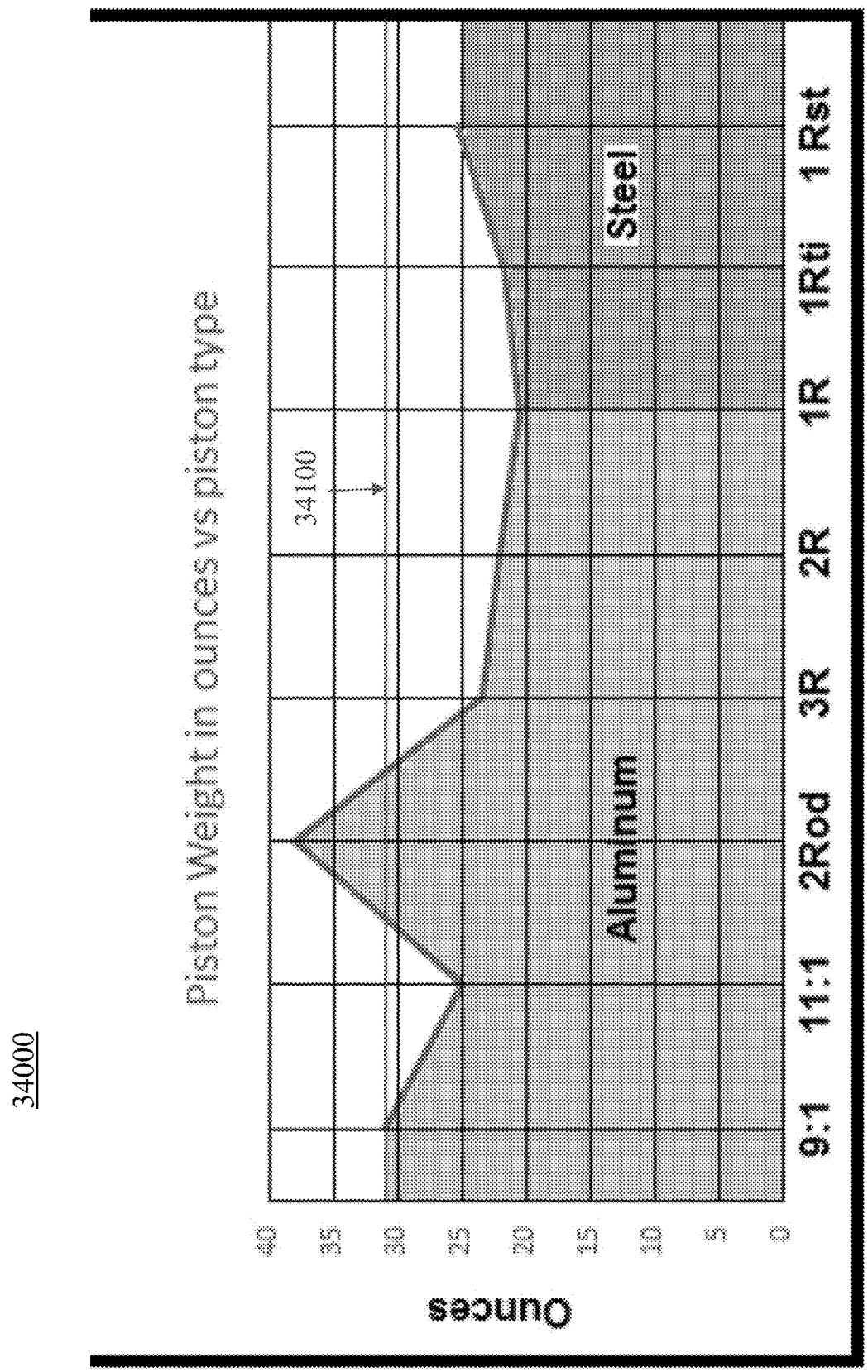

FIG. 34 is a graph 34000, which illustrates piston weight versus piston type. As a general matter, the lower the weight the less force on the connecting rods and crankshaft of an engine. Force equals one half mass times velocity squared, therefore reducing the weight can allow the engine to run at higher rpms. Threshold line 34100 represents a weight above which certain exemplary embodiments would add weight to the crankshaft. Certain exemplary embodiments do not utilize steel pistons because of their weight. Other embodiments utilize steel pistons. Titanium wrist pins and/or titanium stabilizers bars can reduce the weight of one ring titanium pistons versus one ring pistons that utilize steel for both. The lightest pistons are aluminum with a titanium wrist pin and stabilizer bars.

Figure 35:
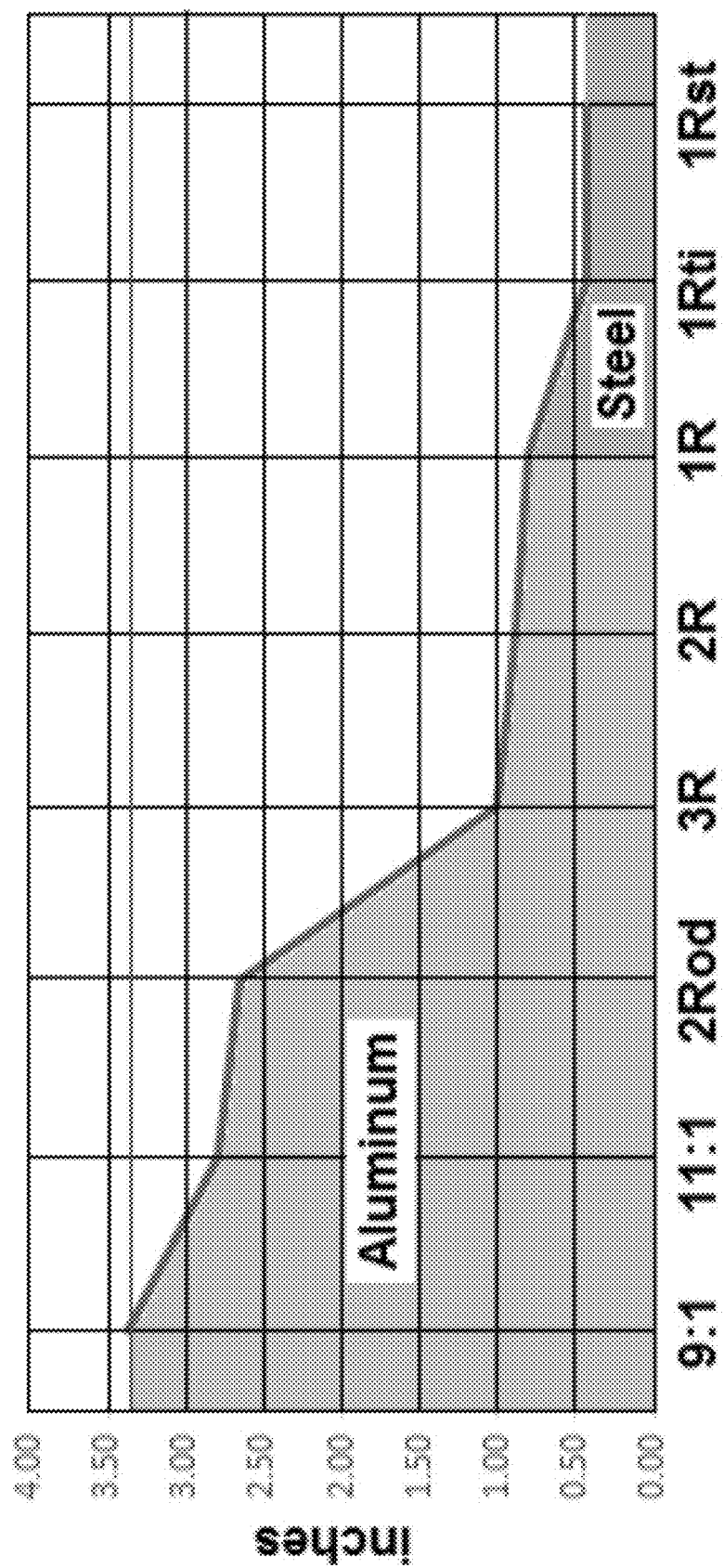

FIG. 35 is a graph 35000, which illustrates piston height versus piston type. By reducing piston height a collar can be moved up in a cylinder and reduce possible stabilizer bar to connecting rod interference. Shorter pistons can be used to reduce cylinder height and hence cylinder block height (i.e., deck height). Shorter pistons can be utilized to increase connecting rod length and reduce the 'side loading' on pistons.

Figure 36:
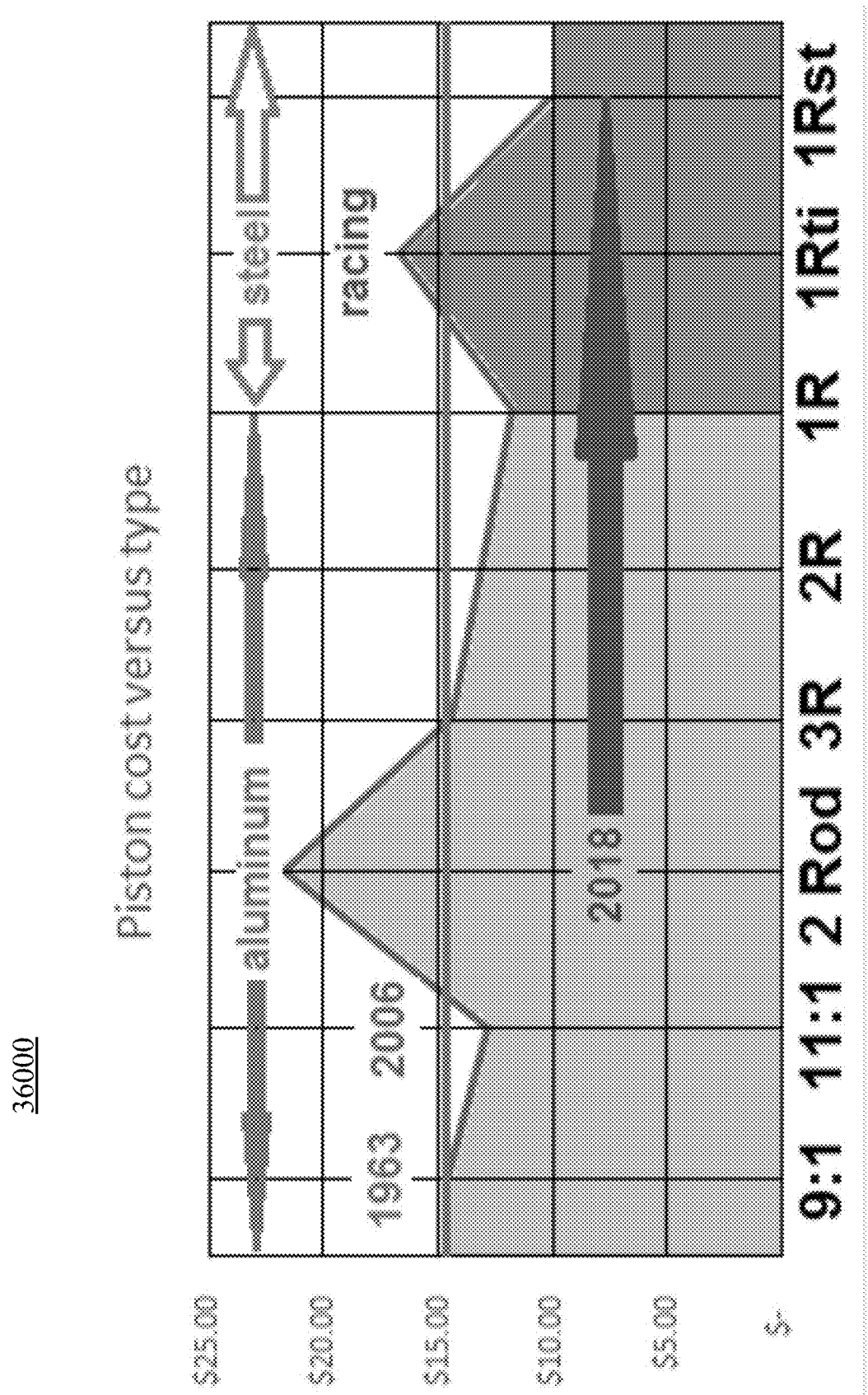

FIG. 36 is a graph 36000, which illustrates relative costs of pistons as a function of type. The costs illustrated are shown in US dollars and will vary with time and economic conditions. In certain exemplary embodiments, the cost of the oil rings and one compression ring plus the cost of machining the piston are eliminated. Steel can be cheaper than aluminum and can be used to reduce cost. Less weight means lower costs for most pistons. Fewer rings can result in less assembly time and thus a lower cost.

The use of all steel pistons can reduce costs by approximately ⅓ compared a certain other pistons. Embodiments that utilize only one piston ring have reduced ring costs as well as machining and assembly costs ring lands and rings. On an exemplary 500 k/year production line, such as the Ford F150 line (Ford and F150 are registered trademarks of the Ford Motor Company of Dearborn, Mich.), that could amount to six pistons per vehicle times $3 or $9 million/year. In the US there are approximately 17 million automobiles sold every year with and average of approximately five pistons per vehicle, therefore approximately 85 million pistons could be produced for a lower cost.

The United States market is presently 15 to 17 million automobiles per year, which equates to approximately 75 million to 100 million pistons. The United States for diesel engines is smaller. Certain exemplary embodiments can reduce pollution due to improved engine energy efficiency.

FIG. 37 is a diagram of an exemplary bearing ball 37000. Certain exemplary embodiments provide a substantially self aligning bushing for collars. To accommodate small tolerance differences is the position, diameter, and/or angle of stabilizer bars, a ball bearing type collar bushing can be used. In such bushings, one ball can be utilized per stabilizer bar and each ball can rotate and move in a very slight distance in either direction in a slot with a path substantially equidistant from a center of an engine cylinder. In certain exemplary embodiments, a hole can be defined through the ball utilized in a stabilizer bar bushing. The ball can be contained in a housing (i.e., a race) that substantially prevents the ball from moving vertically.

The stabilizer bars can be attached to a piston, collar, cylinder head or a special collar replacement cylinder, preferably a sleeve. In embodiments where stabilizer bars are not attached to a piston, stabilizer bars can pass thru the piston and have proper seals surrounding them. In passing thru the piston stabilizer bars change the cylinder volume and hence the compression ratio. The stabilizer bars can number one to many, be made of any materials strong enough to hold the forces, have a low coefficient of friction, be able to with stand the temperatures involved, have low enough weight that the engine rpm and balance are not affected, have low cost, have high durability, and/or be easily installed, etc.

Pistons come in three categories: 'domed', flat, and recessed. Domed pistons have a higher compression ratio than certain other pistons. The "hemi" ("hemi" is a registered trademark of Chrysler Corporation of Highland Park, Mich.) piston is a famous domed piston. Domed pistons and flat pistons can be modified or redesigned to reduce height, be made of steel, and/or use only one piston ring. Recessed or cratered pistons have a thicker piston top to accommodate the recessed area and are challenging to reduce height and/or weight. Diesel pistons can be cratered to confine combustion. A crater can be approximately one half inch or more in depth for a pistons having a diameter of less than approximately five inches. Furthermore the cratered area might not be centered and can be a rotated squarish design. Such embodiments can utilize different size stabilizer bars and/or carefully positioned stabilizer bars. Pistons can hold stabilizer bars or have stabilizer bars pass thru them. In almost every case deducing the skirt size is desirable.

Shorter pistons can utilize longer connecting rods and/or shorter cylinder height (deck height) to make a smaller engine. Short stroke engines (i.e., less than ½ bore engines) can utilize two stabilizer bars with connecting rods. Certain exemplary engines can utilize four stabilizer bars mounted outside a connecting rods path or two stabilizer bars with specially shaped connecting rods. Racing embodiments can utilize two stabilizer bars with specially shaped connecting rods. Diesel pistons can utilize four stabilizer bars. Piston ring reduction can be done and can reduce friction. Pistons can be modified to be full floating, if they are not already. This allows relatively easy removal.

FIG. 38 is a diagram of a top view of a diesel piston 38000. Diesel piston 38000 is an example of utilization of multiple sizes of stabilizer bars 38100, 38120, 38140, 38160. Center area 38200 is a 'crater' and is both offset and rotated. The lower right stabilizer bar is the smallest because of the limited space available. Stabilizer bar 38140 (shown at lower left) is slightly larger, while stabilizer bars 38100, 38120 are larger and substantially the same size. In certain exemplary embodiments stabilizer bar 38100 can comprise a sensor 38300, which can be a temperature sensor and/or a pressure sensor. In certain exemplary embodiments stabilizer bar 38120 can comprise a plug 38400, which can be a spark plug or a glow plug. In certain exemplary embodiments stabilizer bar 38140 can comprise a port 38500, which can be an observation port or a laser port. In certain exemplary embodiments stabilizer bar 38140 can comprise a passageway 38600, which can be a gas passageway or fuel passageway.

For short stroke engines and engines utilizing four stabilizer bars, conventional connecting rods can be used, although converting them to full floating is desirable. Such is a relatively easy machining task that only involves opening a bushing in a small end of the connecting rod. It is possible that a top ridge on some connecting rods might be machined to allow a wrist pin to be located higher on a piston.

Collars that hold stabilizer bar alignment are important. The ability to locate collars inside of a cylinder is significant to retrofit piston machinery. An ability of collars to rotate while maintaining distance from top of cylinder can also be important. Collars can be made of any material that can handle the pressure, temperature, and oil environment. Steel can be the least expensive and therefore preferred. Collars can utilize bushings (e.g., brass or bronze bushings) and to be able to use oil as a lubricant. Ball bearing and other types of low friction bushing alternatives can be utilized. Collars can be made as one piece or in segments that move within each other for alignment purposes.

The collar is held is place by a piston ring that is thinner than the piston rings used on the associated piston and has holes in the ends so that it can be removed.

Collars can be notched on the inside to allow a large end of the connecting rod to pass through. The collar can be notched both above and below a retaining ring to allow removability from either side. The collar can be held in place with spring loaded pins or balls that fit in the same type groove.

Stabilizer bars can be utilized on two cycle as well as four cycle engines. The engines can be air cooled, water cooled, or oil cooled. Engines can be as small as the smallest model airplane engine to the largest shipboard engine. Air/gas compressors can also benefit from utilizing stabilizer bars.

In certain exemplary embodiments, stabilizer bars can comprise sensors such as pressure, oxygen, and/or temperature, etc. In certain exemplary embodiments, stabilizer bars can comprise spark plugs, glow plugs, lasers, visual ports for observation, and/or a passageway for gases and/or fuels. In certain exemplary embodiments, stabilizer bars can pass thru pistons and can define cavities that can house sensors and/or be utilized as passageways. In certain exemplary embodiments, stabilizer bars can comprise and information device.

In embodiments where stabilizer bars comprise a spark plug, igniting any fuel from both the top and the bottom can effectively double a flame velocities. Higher flame velocities reduce engine pumping losses, which are the next largest energy losses in engines after friction.

Lowering friction in piston driven equipment can reduce energy consumption and emissions. Certain exemplary embodiments can improve energy consumption and emissions by 25% or more. Such engines can also run cooler, last longer, and cost less than other embodiments.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
    accommodate—to make room for.
    activity—an action, act, step, and/or process or portion thereof
    adapter—a device used to effect operative compatibility between different parts of one or more pieces of an apparatus or system.
    align—to restrain in a desired position and/or orientation.
    allow—to position so as to facilitate an action.

and/or—either in conjunction with or in alternative to.
apparatus—an appliance or device for a particular purpose.
aperture—an opening in something.
associate—to join, connect together, and/or relate.
ball bearing type collar bushing—a cylindrical sleeve that comprises balls that are constructed to roll with a shaft surrounded by the cylindrical sleeve.
bevel—to create a slanted surface on a piston, wherein the surface is slanted at less than a right angle.
bush—to comprise a bushing.
bushing—a cylindrical lining for an opening in a mechanical part constructed to limit the size of the opening, resist abrasion, and serve as a guide.
can—is capable of, in at least some embodiments.
channel—a passage that is at least partially enclosed.
collar bushing—a cylindrical sleeve.
compressor—a mechanical device that increases the pressure of a gas by reducing its volume.
comprising—including but not limited to.
configure—to make suitable or fit for a specific use or situation.
connect—to join or fasten together.
connecting rod—a rigid member that couples a piston to a crank or crankshaft in a reciprocating engine.
constructed to—made to and/or designed to.
convert—to transform, adapt, and/or change.
couple—to join, connect, and/or link in some fashion.
crankshaft—a shaft driven by a crank mechanism, comprising a series of cranks and crankpins to which the connecting rods of an engine are attached, which shaft is a mechanical constructed to convert a reciprocating motion to a rotational motion.
C ring—an engine ring that is placed in a groove, which ring has a "c" shaped cross-section.
cycle—to go through a repeated series of engine crankshaft rotations propelled by fuel combustion in engine cylinders.
cylindrical—having a shape of a surface or solid bounded by two parallel planes and generated by a straight line moving parallel to the given planes and tracing a curve bounded by the planes and lying in a plane perpendicular or oblique to the given planes.
define—to establish the outline, form, or structure of
determine—to obtain, calculate, decide, deduce, and/or ascertain.
device—a machine, manufacture, and/or collection thereof.
diameter—a length of a line passing through the center of a substantially circular object and meeting the circumference or surface at each end.
diesel engine—is an internal combustion engine in which ignition of the fuel, which is injected into the combustion chamber, is caused by an elevated temperature of the air in the cylinder due to mechanical compression.
dish—to create a concave surface on a piston.
down—in a direction toward from the Earth's surface.
end—a most extreme part of an object.
engine—a machine that converts chemical or electrical energy to mechanical motion.
engine block—a structure that comprises engine cylinders, and other parts, of an internal combustion engine.
engine cylinder—a cylindrical chamber of an internal combustion engine in which the pressure of a gas or liquid moves a sliding piston.
estimate—to calculate and/or determine approximately and/or tentatively.
friction—a force resisting a relative motion of solid surfaces, fluid layers, and material elements sliding against each other.
fuel—a material used to produce energy by burning.
gapless—substantially lacking a space around a circumference.
gas—a substance (such as air) that has neither independent shape nor volume but tends to expand indefinitely.
generate—to create, produce, give rise to, and/or bring into existence.
glow plug—a heating device constructed to aid starting diesel engines.
groove—a narrow channel.
hollow—defining an unfilled space within.
hold—to contain something.
inside—interior to a component.
install—to connect or set in position and prepare for use.
lack—to be substantially devoid of
laser—a device that generates an intense beam of coherent monochromatic light (or other electromagnetic radiation) by stimulated emission of photons from excited atoms or molecules.
may—is allowed and/or permitted to, in at least some embodiments.
method—a process, procedure, and/or collection of related activities for accomplishing something.
move—to go or pass to another place or in a certain direction.
notch—an indentation or incision on an edge or surface.
observation—constructed for use in viewing something.
oil ring—a piston ring, typically the lowest ring of a three ring set, which acts to control oil flow to the piston skirt and the cylinder in which the piston moves.
orientation—positioning.
passageway—a space that connects one place to another.
pass by—move by without touching.
piston—a system comprising a piston head constructed to slide within tube in which it moves up and down against a liquid or gas, used in an internal combustion engine to convert chemical energy to kinetic energy.
piston head—a cylinder comprised by a piston, which cylinder is constructed to slide within tube in which it moves up and down against a liquid or gas.
piston ring—a split ring that fits into a groove on the outer diameter of a piston in a reciprocating engine such as an internal combustion engine or steam engine.
place—to put something in a predetermined location.
plurality—the state of being plural and/or more than one.
port—an opening constructed to receive an object.
predetermined—established in advance.
press—to compress or squeeze.
pressure—a measure of force applied uniformly over a surface.
project—to calculate, estimate, or predict.
provide—to furnish, supply, give, and/or make available.
receive—to act as a receptacle for.
recommend—to suggest, praise, commend, and/or endorse.
reduce—to diminish.
relative to—in comparison with.
repeatedly—again and again; repetitively.
request—to express a desire for and/or ask for.
restrain—to limit motion of something.
retaining ring—a ring that is constructed to maintain alignment of a stabilizer bar collar in a cylinder.
ring—a band of material.

rod—a thin straight bar or tube having a substantially circular cross-section.

sensor—a device used to measure a physical quantity (e.g., temperature, pressure, capacitance, and/or loudness, etc.) and convert that physical quantity into a signal of some kind (e.g., voltage, current, power, etc.).

set—a related plurality.

skirt—a hollow portion of a piston that is a closest portion of the piston to an engine crankshaft and is constructed to keep the piston from tilting when the piston is operating in an engine.

spark plug—a device constructed to deliver electric current from an ignition system to the combustion chamber of a spark-ignition engine to ignite a compressed fuel/air mixture via an electric spark.

stabilizer bar—a rod that couples a piston head to a stabilizer bar collar.

stabilizer bar collar—a ring that is coupled to, and restrains motion of, stabilizer bars.

store—to place, hold, and/or retain.

stroke—the movement in either direction of a piston.

substantially—to a great extent or degree.

support—to bear the weight of, especially from below.

system—a collection of mechanisms, devices, machines, articles of manufacture, processes, data, and/or instructions, the collection designed to perform one or more specific functions.

temperature—a measure of kinetic energy of a substance.

through—moving in a first side of something and to a second side thereof.

touch—to contact.

transmit—to send as a signal, provide, furnish, and/or supply.

turn—to change the position of by traversing an arc.

two-cycle engine—a type of internal combustion engine which completes a power cycle with two strokes (up and down movements) of the piston during only one crankshaft revolution.

up—in a direction away from the Earth's surface.

vertical—substantially perpendicular to horizontal.

via—by way of and/or utilizing.

weighs—has a mass that results in a force with which a body is attracted to Earth, which force is equal to the product of the object's mass and the acceleration of gravity.

wrist pin—a rod that couples a piston to a connecting rod.

NOTE

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. An engine comprising:
an engine block, the engine block defining a plurality of cylinders, each cylinder of the plurality of cylinders defining a cylinder groove;
a stabilizer bar collar, the stabilizer bar collar defining a collar groove;
a retaining ring, the retaining ring constructed to engage with the collar groove of the stabilizer bar collar, the retainer ring constructed to engage with the collar groove such that the stabilizer bar collar is restrained from moving up or down in a cylinder of the engine block,
a piston, the piston comprising a piston head and a connecting rod coupled to the piston head, the piston lacking any skirt, the piston utilizing only one ring, the one ring a gapless compression ring, the piston lacking any oil ring, the connecting rod defining a connecting rod groove; and
a plurality of stabilizer bars, the plurality of stabilizer bars directly coupled to the piston head, the plurality of stabilizer bars constructed to align the piston as it cycles in the engine block thereby reducing friction, at least one of the plurality of stabilizer bars passing the connecting rod via the connecting rod groove.

2. The engine of claim 1, wherein:
the plurality of stabilizer bars are constructed to align the piston as it cycles in the engine block thereby reducing friction.

3. The engine of claim 1, wherein:
a wrist pin, the wrist pin coupling the connecting rod to the piston head, the wrist pin retained by a C ring; and
the piston is aluminum.

4. The engine of claim 1, wherein:
a wrist pin, the wrist pin coupling the connecting rod to the piston head, the wrist pin pressed through the connecting rod; and
the piston is steel.

5. The engine of claim 1, further comprising:
a third stabilizer bar; and
a fourth stabilizer bar, each of the third stabilizer bar and the fourth stabilizer bar constructed to align the piston as it cycles in the engine block thereby reducing friction.

6. The engine of claim 1, wherein:
the stabilizer bar collar is notched on its inside to allow a big end of the connecting rod to pass through, wherein the stabilizer bar collar is constructed to align the first stabilizer bar relative to the piston head.

7. The engine of claim 1, wherein:
the stabilizer bar collar comprises a bushed aperture, wherein:
the stabilizer bar collar is constructed to align the first stabilizer bar relative to the piston head;
the bushed aperture comprises a ball bearing type collar bushing; and
the stabilizer bar collar defines a notch, which notch can be utilized for nondestructive removal or retaining collar from one of the plurality of cylinders of the engine.

8. The engine of claim 1, wherein:
the first stabilizer bar comprises at least one of a pressure sensor and a temperature sensor.

9. The engine of claim 1, wherein:
the stabilizer bar collar is cast into the engine block.

10. The engine of claim 1, wherein:
the first stabilizer bar comprises a spark plug.

11. The engine of claim 1, wherein:
the first stabilizer bar comprises a glow plug.

12. The engine of claim 1, wherein:
the first stabilizer bar defines a laser port.

13. The engine of claim 1, wherein:
the first stabilizer bar defines an observation port.

14. The engine of claim 1, wherein:
the first stabilizer bar defines a gas passageway.

15. The engine of claim 1, wherein:
the first stabilizer bar defines a fuel passageway.

16. The engine of claim 1, wherein:
the first stabilizer bar is hollow.

17. The engine of claim 1, wherein:
the first stabilizer bar has a different diameter than a second stabilizer bar comprised by the engine.

18. The engine of claim 1, wherein:
the engine is a diesel engine.

19. The engine of claim 1, wherein:
the engine has reduced friction between the piston and an engine comprising pistons lacking stabilizer bars.

20. The engine claim 1, wherein:
a skirt of the piston does not touch a cylinder of the engine during a full stroke.

21. The engine of claim 1, wherein:
the piston is beveled.

22. The engine of claim 1, wherein:
the connecting rod is dished to accommodate the first stabilizer bar as the connecting rod moves in the engine.

23. The engine of claim 1, wherein:
the stabilizer bar collar defines a bushed aperture, wherein the bushed aperture comprises a ball bearing type collar bushing.

24. The engine of claim 1, wherein:
a skirt of the piston is over than 3 inches in length at a skirt of the piston.

25. The engine of claim 1, wherein:
a skirt of the piston is less than 2.8 inches in length.

26. The engine of claim 1, wherein:
a skirt of the piston is less than 1.1 inches in length.

27. The engine of claim 1, wherein:
the piston weighs over 32 ounces.

28. The engine of claim 1, wherein:
the piston weighs over 12 ounces.

29. The engine of claim 1, wherein:
the piston weighs less than 12 ounces.

30. The engine of claim 1, wherein:
the piston is constructed to receive three piston rings.

31. The engine of claim 1, wherein:
the first stabilizer bar has a nominal diameter of 0.375 inches.

32. The engine of claim 1, wherein:
the first stabilizer bar has a nominal diameter of 0.5 inches.

33. The engine of claim 1, wherein:
a top ring of the piston is gapless.

34. The engine of claim 1, wherein:
the engine is a two cycle engine.

35. The engine of claim 1, wherein:
the engine is comprised by a compressor.

36. The engine of claim 1, wherein:
the first stabilizer bar is coupled to a collar and passes through the piston.

37. A piston comprising:
a piston head;
a connecting rod coupled to the piston head;
a first stabilizer bar, the first stabilizer bar directly coupled to the piston head;
a second stabilizer bar, the second stabilizer bar directly coupled to the piston head;
a retaining ring; and
a stabilizer bar collar, the stabilizer bar collar defining a pair of bushed apertures, a first bushed aperture of the pair of bushed apertures constructed to receive the first stabilizer bar, a second bushed aperture of the pair of bushed apertures constructed to receive the second stabilizer bar, wherein the stabilizer bar collar is constructed to hold the first stabilizer bar and the second stabilizer bar in a substantially vertical orientation relative to a crankshaft on an engine comprising the piston head, the stabilizer bar collar defining a groove, the groove constructed to receive the retaining ring, wherein when placed in the groove in the stabilizer bar collar, the retaining ring allows the stabilizer bar collar to turn, but not move up or down in an engine cylinder of the engine.

* * * * *